Jan. 14, 1964   J. D. BATCHELOR ETAL   3,117,918
PRODUCTION OF LOW SULFUR FORMCOKE
Filed Sept. 13, 1960   8 Sheets-Sheet 1

INVENTORS.
JAMES D. BATCHELOR   GEORGE P. CURRAN
ROBERT J. FRIEDRICH   EVERETT GORIN
BY Henry Kolin INVENTORS.
JAMES D. BATCHELOR  GEORGE P. CURRAN
ROBERT J. FRIEDRICH  EVERETT GORIN
BY
Henry Kolin INVENTORS.
JAMES D. BATCHELOR  GEORGE P. CURRAN
ROBERT J. FRIEDRICH  EVERETT GORIN
BY
Henry Kolin Jan. 14, 1964     J. D. BATCHELOR ETAL     3,117,918
PRODUCTION OF LOW SULFUR FORMCOKE
Filed Sept. 13, 1960     8 Sheets-Sheet 4

*INVENTORS.*
JAMES D. BATCHELOR   GEORGE P. CURRAN
ROBERT J. FRIEDRICH   EVERETT GORIN
BY
Henry Kolin INVENTOR
JAMES D. BATCHELOR  GEORGE P. CURRAN
ROBERT J. FRIEDRICH  EVERETT GORIN
BY
Henry Kolin INVENTOR.
JAMES D. BATCHELOR  GEORGE P. CURRAN
ROBERT J. FRIEDRICH  EVERETT GORIN
BY Henry Kolin INVENTORS.
JAMES D. BATCHELOR GEORGE P. CURRAN
ROBERT J. FRIEDRICH EVERETT GORIN
BY
Henry Kolin

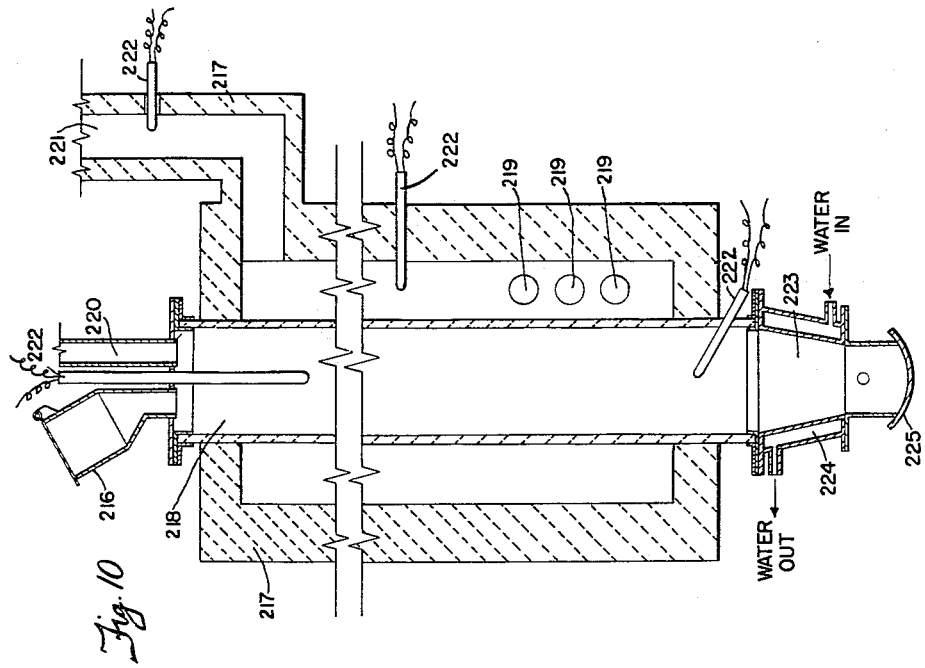
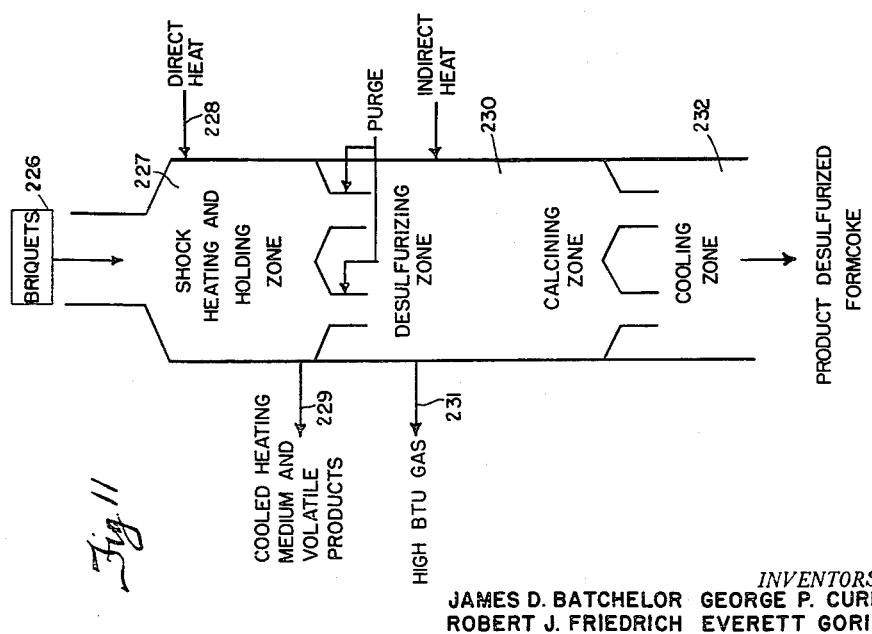

3,117,918
PRODUCTION OF LOW SULFUR FORMCOKE
James D. Batchelor, Springfield, Va., and George P. Curran, Pittsburgh, Robert J. Friedrich, Finleyville, and Everett Gorin, Pittsburgh, Pa., assignors to Consolidation Coal Company, Pittsburgh, Pa., a corporation of Pennsylvania
Filed Sept. 13, 1960, Ser. No. 55,624
21 Claims. (Cl. 202—26)

This invention relates to a method for preparing low-sulfur formcoke of metallurgical grade from caking bituminous coal containing substantial quantities of sulfur. It particularly relates to an improvement in desulfurizing sulfur-containing coal-char agglomerates.

This application is a continuation-in-part of our co-pending applications Serial Number 853,742, filed November 18, 1959, and Serial Number 1,837, filed January 5, 1960, which are now abandoned.

The most widely used method for smelting iron ores is the reduction of these ores by means of coke in the blast furnace. Coke obtained by the high-temperature carbonization of coal in by-product coke ovens is the type of coke most extensively used. Only certain coals, referred to as "coking" coals, are suitable for producing coke having the desired physical and chemical properties for metallurgical use. It is highly desirable, and frequently held essential, that the sulfur content of the coke to be used for metallurgical purposes be low. Thus a specification of the American Society for Testing Materials (ASTM Designation D166-24) requires for the production of metallurgical coke that the composition of the coking coal be such that the dry coke produced therefrom will not contain more than 1.0 percent of sulfur in the case of foundry coke and 1.3 percent of sulfur in the case of blast furnace coke. Under conventional high-temperature coking conditions, where the coking charge is essentially a caking coal of bituminous rank, the sulfur percentage of the coke obtained, based on the weight of coke, is usually from 80 to 100 percent that of the sulfur percentage based on the weight of the coal from which it was made. ("Coke Evaluation Project," Contrib. to Metallurgy of Steel No. 43, Amer. Coke and Coal Chemicals Inst., Washington, D.C.) On this basis, coking coals of metallurgical grade may ordinarily not contain more than about 1.60 percent of sulfur. Inasmuch as reserves of such low-sulfur coking coals are limited, coals containing 1.5 percent or more sulfur, after washing must be blended with low-sulfur coals in order to increase the total supply available for producing metallurgical grade coke. Thus much of the metallurgical grade coke produced will have a sulfur content close to the maximum permissible limit of 1.3 percent.

Accordingly it is an object of this invention effectively to provide newly available reserves of metallurgical coal.

It is a further object of the present invention to use high sulfur caking coal as a raw material for preparing low-sulfur high-strength metallurgical fuel of substantially uniform size and shape.

It is a further object of this invention to provide a simplified procedure for producing desulfurized formcoke.

It is still a further object in using this simplified procedure to utilize coals having a sulfur content up to 2.2 percent by weight or higher for preparing low-sulfur calcined formcoke of metallurgical grade.

It is still a further object to provide a simplified method for the simultaneous desulfurizing and calcining of coal-char agglomerates.

It is yet an additional object to provide a simplified procedure for obtaining significant desulfurization of briquetted agglomerates containing coal and fluidized low-temperature carbonization char, which procedure avoids the use of pressurized conditions or devolatilization gas recycle.

In accordance with this invention, heat-processed high-sulfur content coal-char agglomerates are desulfurized to yield metallurgical grade formcoke prior to or concurrently with a calcining treatment. In a first aspect of this invention, a combined desulfurization and calcining treatment of the coal-char agglomerates is conducted in the presence of at least one atmosphere of hydrogen and in an environment having a volume ratio of $H_2S/H_2$ less than 0.02. In a second aspect of this invention, the coal-char agglomerates are fed at atmospheric pressure in a descending column in countercurrent relation to autogenously produced devolatilization gas consisting principally of hydrogen. In both aspects of the process, the resulting desulfurized and calcined agglomerates are recovered as a metallurgical grade formcoke, preferably after being cooled below their atmospheric kindling temperature.

The agglomerates are preferably formed either as hot-tumbled coal-char agglomerates, preferably kiln-carbonized at a temperature above 800° F., or as briquetted coal-char agglomerates, preferably containing a pitch binder. The method of preparing hot-tumbled agglomerates will be hereinafter described. It is preferred, however, to prepare the coal-char agglomerates by briquetting, that is by an operation in which a press is used to effect cohesion and compaction of the fine particles of coal and char. The addition of special binding materials such as pitch to the coal and char particles has been found to result in briquets of substantially improved strength when processed to formcoke. The pitch serves particularly as a temporary binder to provide adequate strength to the uncarbonized briquets to permit their ready handling before carbonization.

The coal-char agglomerates contain a caking bituminous coal and a low-density char, below about 45 pounds per cubic foot, obtained by a low temperature carbonization, i.e., at a temperature below 1400° F., of a caking bituminous coal. Either or both the caking bituminous coal and low temperature carbonization char may utilize low volatile, medium volatile, or high volatile coals, alone or in suitable admixture. In a particularly preferred feature of this invention, char having a poured bulk density less than about 30 pounds per cubic foot (ASTM test D292-29) is obtained via a fluidized low temperature carbonization of a high volatile bituminous coal.

The coal-char briquets are shockheated whereby their surface is rapidly elevated, virtually instantaneously, to a temperature of 900 to 1250° F. The surface of the briquets is maintained at a temperature of 900 to 1250° F. until they have attained throughout a temperature of 900 to 1250° F. Thereafter the coked briquets are subjected to a combined desulfurizing and calcining treatment whereby they are heated to a temperature above about 1550° F.

In a preferred embodiment of this invention utilizing these coal-char briquets, a high-sulfur, caking bituminous coal or mixture of coals, preferably a high volatile caking coal, and one having an average sulfur content between about 1.6 and 5 percent by weight, is converted to a finely divided char by low temperature carbonization. This carbonization is preferably performed under fluidized-bed conditions so as to yield a char having a bulk density less than about thirty pounds per cubic foot. With increasing bulk density, desulfurization becomes more difficult. The carbonization temperature used to produce the char should ordinarily not exceed 1400° F. The use of chars formed at substantially higher temperatures will result in briquets yielding lesser amounts of devolatilization gas during the subsequent desulfurizing and calcining steps. Also, where the carbonization temperature exceeds 1400° F., the sulfur present in the char becomes chemically "fixed" and cannot be readily removed. The finely divided char is mixed with a portion of uncarbonized coal, and briquets are prepared from the resulting admixture. It is generally preferred because of the higher cost of char compared with coal to have the char content in the coal-char briquets as low as possible. However, in order to provide briquets having sufficient mechanical strength to yield formcoke suitable for use in a blast furnace, the char content of the coal-char briquets should ordinarily not be less than 40 percent by weight. Where optimum mechanical strength is not required, the amount of char in the coal-char briquet may be lowered, although this will tend to reduce somewhat the yield of devolatilization gas during the subsequent desulfurizing and calcining steps. Where a high-char content briquet is desired, the amount of char in the coal-char briquet may be increased to 90 percent without markedly lowering the strength of the ultimate formcoke. Increasing the char content beyond 90 percent results in a formcoke of insufficient physical strength for use in blast furnace operations.

To prepare low-sulfur calcined formcoke of metallurgical grade, i.e., one having suitable physical and chemical properties, the surface of these briquets is heated as rapidly as possible, i.e., "shock-heated," to a temperature in the range of 900 to 1250° F., and then the surface is further maintained at this temperature until the briquets attain a carbonizing temperature above 900° F. throughout.

Volatile materials that are evolved from the briquet are recovered as tar vapors and gases. In the shockheating treatment, tar vapors and a hydrocarbon-rich gas are the principal evolution products. This latter gas is generated in sufficient quantity to supply autogenously the hydrogen required in the process, thereby avoiding need of an extrinsic hydrogen supply.

We have successfully prepared metallurgical fuel according to our process from high volatile caking bituminous coal from the Pittsburgh seam having a sulfur content of 2.5 percent. The resulting metallurgical fuel had a sulfur content less than one percent and possessed density and strength characteristics comparable to acceptable metallurgical coke. In addition, our metallurgical fuel is produced in substantially uniform size and shape.

A brief review of the sulfur phenomena of coal will be of aid in appraising the environment of our invention, particularly with reference to the first aspect of our process.

There are two basic types of sulfur in coal and char which are usually referred to as the organic and inorganic sulfur. Organic sulfur is associated directly with the carbonaceous matter although the particular way in which it is bound is unknown. The removal of organic sulfur by hydrogen is a reversible reaction, $$(C)-S+H_2 \rightleftharpoons (C)+H_2S$$

hydrogen is a reversible reaction, i.e., at relatively high ratios of hydrogen sulfide to hydrogen, sulfur is transferred from the gas phase to the carbonaceous solid phase. It is thus obvious that hydrogen sulfide is a strong inhibitor for removal of organic sulfur, and the volume ratio of $H_2S/H_2$ must be maintained at a low value for the desulfurizing action to proceed.

For any given set of conditions, there is a ratio of hydrogen sulfide to hydrogen at which there is no driving force for either removal or deposition of sulfur on the carbonaceous matter. This ratio determines the so-called point of total inhibition. The total inhibition ratio is a function of the desulfurization temperature, the total sulfur content and prior thermal history of the carbon. The ratio, for example, is relatively high for carbonaceous solids having relatively high sulfur content. We have also found that the ratio decreases according to the severity of the prior thermal treatment of the carbonaceous solids. Severe thermal treatment also drastically reduces the rate at which the desulfurization reaction proceeds.

The total inhibition phenomenon shows the advantages inherent in a countercurrent process. The correlation of desulfurization rate with thermal history of the carbonaceous solids makes it imperative to conduct the calcining and desulfurization operations simultaneously. This feature is an inherent part of our invention.

Inorganic sulfur occurs in the form of several definite inorganic compounds. The major portion of the inorganic sulfur occurs in coal in the form of iron pyrites which is converted largely to ferrous sulfide by thermal transformation on heating to desulfurization temperature.

Removal of sulful from ferrous sulfide is a reversible reaction as in the case of the organic sulfur.

$$FeS+H_2 \rightleftharpoons Fe+H_2S$$

The equilibrium ratio of $H_2S/H_2$ is in this case, however, a function only of the temperature and is independent of the amount of sulfur present. The value of the equilibrium ratio is considerably lower than that which applies to the removal of the bulk of the organic sulfur. The equilibrium value is, for example, 0.0012 at 1350° F. and 0.0028 at 1600° F. Hence removal of sulfur existing as ferrous sulfide requires that the volume ratio $H_2S/H_2$ be less than 0.0012 at 1350° F. and less than 0.0028 at 1600° F.

Other types of inorganic sulfur such as calcium sulfide which are present in small quantities cannot be removed within practical limits by hydrogen. In addition, there is a small quantity of refractory organic sulfur of the order of 0.3–0.5 weight percent of the carbon which cannot be removed by using practical quantities of hydrogen.

One method for maintaining a low value for the volume ratio $H_2S/H_2$ is to supply sufficient quantities of hydrogen gas so that the sulfur removed from the briquets (as hydrogen sulfide) is less than two percent of the total hydrogen gas. Countercurrent movement of the hydrogen gas and the briquets undergoing desulfurizing treatment is desirable in this instance. The incoming gases, having a low volume ratio of $H_2S/H_2$, contact briquets which already have lost the bulk of organic sulfur and hence the incoming gas can remove some inorganically bound sulfur. The existing gases, having absorbed $H_2S$, thereafter contact incoming briquets which still contain the more readily removable organic sulfur which may be released into the exiting gases. This method, corresponding to that described in U.S. Patent 2,717,868, is employed in the embodiment of the present invention as shown in FIGURE 4.

Another method for maintaining a low value for the volume ratio $H_2S/H_2$ is to remove the hydrogen sulfide from the gas phase in situ as soon as it is formed. For this purpose, we adopt the process described in U.S. Patent 2,824,047 and employ solid "acceptors" for hydrogen sulfide.

These solid acceptors for hydrogen sulfide are materials which have a greater affinity for hydrogen sulfide than those materials with which the sulfur is bound in the carbonaceous solid. The equilibrium volume ratio $H_2S/H_2$ for the acceptor solid at the desulfurizing temperature should be lower than the equilibrium volume ratio of the sulfur which is to be removed from the briquet. The solid acceptor, furthermore, should be resistant to abrasive degradation at elevated temperatures and must be capable of being regenerated from its sulfur-containing form into a state where it will once more absorb hydrogen sulfide. The solid acceptors are capable of reacting with hydrogen sulfide to form solid sulfide in the presence of hydrogen gas and also capable of rejecting sulfide sulfur under oxidative conditions. A preferred acceptor for our desulfurization process is lime in the form of calcined dolomite. Another preferred acceptor is manganese oxide impregnated on an inert carrier or in the form of manganese ore. Other suitable acceptors include zinc oxide, nickel oxide, cobalt oxide, copper oxide, lead oxide, and iron oxide. Suitable porous carriers for these impregnated oxides include silica-alumina, silica, alumina, natural clay pellets, and the like. Amphoteric and acidic oxides may be employed as supports if regeneration conditions be selected to avoid excessive reaction between the impregnated acceptor ingredient and the support.

The acceptor solid may be represented generally by the term "metal oxide." Accordingly, the acceptor solid removes hydrogen sulfide from the gas phase.

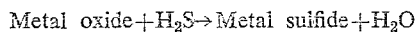

thereby forming metal sulfide and water. The metal sulfide thereafter may be removed from the desulfurizing zone and regenerated to the oxide form by reaction with oxygen.

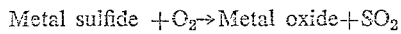

The acceptor regeneration occurs at a temperature above the desulfurizing temperature, and hence the regenerated acceptor may be recirculated through the desulfurizing zone to supply not only capacity for absorbing hydrogen sulfide but also to supply the thermal requirements of calcining.

For convenience in describing this invention, the process employed herein has been divided into two distinct aspects of practice. It will be realized, however, that these two aspects may be readily intermingled, and various features characteristic of one may be used with the other.

A first aspect of the process of this invention is characterized by the use of pressurized conditions, devolatilization gas recycle, and a very low ratio of $H_2S/H_2$. For obtaining maximal desulfurization, the $H_2S/H_2$ ratio may be further lowered by the use of $H_2S$ acceptors, hydrogen gas pressure may be increased, gas recycle may be repeated, and the low temperature char selected for forming the coal-char agglomerate will have a bulk density well below 30 pounds per cubic foot.

In a second aspect of our process, in its most simplified version substantial and significant desulfurization is obtained without the use of any pressurized equipment, and without any external recycling of gas or external sulfur-removal steps. This desulfurization is obtained by feeding the coal-char agglomerates at atmospheric pressure in a descending column in countercurrent relation to an upwardly moving stream of only in situ-generated autogenous devolatilizing gas.

For a more complete understanding of the present invention, its objects and features, reference should be had to the following detailed description and accompanying drawings in which:

FIGURE 10 is an elevational view, partly in section, of apparatus for the desulfurizing and calcining treatment of carbonized coal-char agglomerates in accordance with the aspect of the invention illustrated in FIGURE 8;

FIGURE 11 is a schematic illustration of a unitary vessel for performing the several steps of the process of this invention in connection with FIGURE 8.

Figure 1:
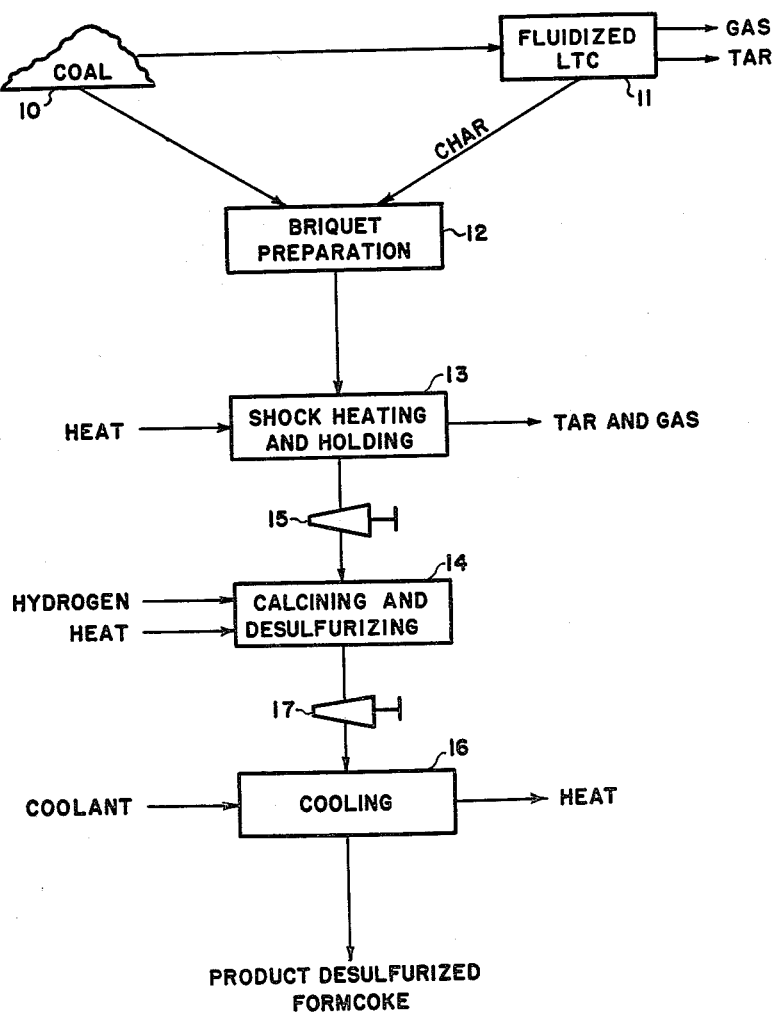
FIGURE 1 is a schematic flow diagram indicating the processing steps involved in a first aspect of the process of the present invention.

The coal-char agglomerates which are an essential feature of this invention, are preferably formed by either briquetting or hot-tumbling. It is particularly preferred to prepare the coal-char agglomerates by briquetting, and the several figures of the drawing will be discussed with respect to the preparation and use of these briquets in the process of this invention. The alternative method of forming hot-tumbled coal-char agglomerates will be subsequently described.

1. FIRST ASPECT OF PROCESS

A preferred embodiment of our present process will be described in detail by reference to FIGURE 1. A caking bituminous coal and preferably a high volatile coal from a source 10 is provided as starting material. A portion of the high volatile coal is processed via fluidized low temperature carbonization in a zone 11 whereby the coal is converted into gas, tar and a porous finely divided solid distillation residue termed "char." Char production from high volatile coals by fluidized low temperature carbonization processes is swelled and expanded from the original dimensions of the coal particles into fluffy, rounded particles. The sponge-like porous properties of the char particles result in a low bulk density of the material and a correspondingly low physical strength. The bulk density of the material is from about 20 to 25 pounds per cubic foot. In general, the char is sufficiently finely divided, as produced, to pass through a 14 mesh Tyler standard screen. While it is possible to prepare high density char, i.e., above about 45 pounds per cubic foot, from high volatile bituminous coal by fluidized low temperature carbonization processes, such dense chars are not suitable in the present process.

Any low temperature carbonization process or type of caking bituminous coal may be used as long as the resultant char possesses a low bulk density. Chars having a low bulk density that is less than 30 pounds per cubic foot are produced, for example, from fluidized low temperature carbonization processes employing preliminary treatment of the coal, as by oxidation, to achieve operability. Char produced by fluidized low temperature carbonization permits the preparation of product metallurgical fuel having the strength and density corresponding to existing coke oven products. In addition, the char produced by fluidized low temperature carbonization is peculiarly amenable to the desulfurization treatment of the present invention.

The finely divided product char is blended with finely divided caking bituminous coal in a briquet preparation zone 12 wherein substantially uniform sized briquets are prepared. In a preferred embodiment, the coal employed in the briquet preparation may be the same coal which is employed in preparing the char via the fluidized low temperature carbonization process. Alternatively, the coal employed in the briquets may be from a different source provided that the coal possesses highly caking properties. If desired, binder materials such as pitch may be employed in the briquet preparation stage to introduce shape retaining properties to the briquet prior to the subsequent processing.

The briquets are transferred from the briquet preparation zone 12 into a shockheating and holding zone 13 for shockheating whereby their surface is virtually instantaneously elevated to a temperature in the range of 900 to 1250° F. The surface of the briquets is retained at a temperature of 900 to 1250° F. until the briquets attain throughout a temperature of 900 to 1250° F.

The residence time of the briquets in the shockheating and holding zone 13 is from about 30 to 60 minutes. Unless sufficient residence time is provided for the briquets in the shockheating and holding zone 13, the further treatment will introduce serious cracks and fissures into the briquets resulting in a shattered product. As the dimensions of the briquets are increased, the residence time in the shockheating and holding zone 13 should increase. With small briquets (less than one inch diameter) the problem is not severe. However where larger briquets are being prepared (two inches diameter and larger) the holdup time is critical. We have prepared satisfactory two inch diameter briquets by employing 30 to 45 minutes residence time at shockheating conditions. The briquets must not be heated beyond the shockheating temperature until their coal constituent has passed entirely through its plastic temperature range.

Although some of the heat required in the shockheating and holding zone may be supplied indirectly, we prefer to provide the bulk of the heat directly, either by means of hot gases as will be described in connection with FIGURE 2 or alternatively by recirculation of finely divided heat carrying medium as will be described in connection with FIGURE 3. The resulting coked briquets are introduced into a calcining and desulfurizing zone 14 which is maintained under elevated temperatures sufficient to provide at least one atmosphere of hydrogen pressure. A pressure seal, indicated schematically by the numeral 15, is illustrated in one embodiment in FIGURE 6.

In this first aspect of the invention, the briquets fed to the desulfurizing and calcining zone 14 are elevated to a temperature above about 1550° F. directly by means of hot gases as will be described in connection with FIGURE 4 or, alternatively, by means of hot heat-carrying material as will be described in connection with FIGURE 5. While in the calcining and desulfurizing zone 14, the briquets are exposed to at least one atmosphere of hydrogen gas to effect the desired desulfurizing treatment. The volume ratio of $H_2S/H_2$ is maintained below 0.02 to avoid suppression of the desulfurizing reaction. The volume ratio of $H_2S/H_2$ can be maintained at a low value by providing sufficient hydrogen gas with external $H_2S$ removal facilities as described in the aforementioned U.S. Patent 2,717,868. Alternatively, the volume ratio of $H_2S/H_2$ may be maintained at a low value by providing in situ solid acceptors for hydrogen sulfide as described in the aforementioned U.S. Patent 2,824,047. In this latter embodiment the solid acceptors for hydrogen sulfide may serve also as the heat-carrying material. Concomitant devolatilization of the briquets occurs in the calcining and desulfurizing zone 14 to produce additional hydrogen gas which may be employed by appropriate recycle techniques in the process. The desulfurization process proceeds at an optimum rate in the temperature range 1300 to 1500° F. Prolonged exposure of the briquet at temperatures above about 1500° F. adversely affects the attainable desulfurization reaction rate. Where desirable high strength properties in the solid product are sought, a final calcining temperature above about 1500° F. is required. Thus optimum results are obtained by conducting the desulfurization reaction principally while the briquets are being raised in temperature within the combined desulfurizing and calcining zone.

The resulting calcined desulfurized briquets are gradually cooled directly by means of a coolant medium in a cooling zone 16. The cooling treatment preferably is conducted at atmospheric pressures and may be effected in part simultaneously with the transfer of calcined desulfurized briquets from the superatmospheric pressures existing in the calcining and desulfurizing zone 14 by means of the pressure seal apparatus schematically illustrated by the numeral 17 and further illustrated in our embodiment in FIGURE 7.

Hot gases entering the top of the vessel 20 pass downwardly through briquet bed 26. Initially the surfaces of the briquets are virtually instantaneously heated to a temperature in the range of 900 to 1250° F. This shockheating serves to form a crust of coked material around each individual briquet which provides shape retention for the briquets and avoids adherence of the briquets. Gases and tar vapors are evolved from the briquets under the thermal treatment and are swept along with the hot gases for recovery at temperatures of 1200 to 1600° F. through a conduit 31 near the bottom of the vessel 20. The tar vapors are processed for recovering the valuable tars and gases in a recovery zone 32. A portion of the gaseous product may be employed as the fuel gas in the present process as indicated by the conduit 33.

Starting with briquets prepared as hereinbefore described, a typical distribution of the products of the shockheating and holding zone 20 is as follows.

| Product: | Weight percent |
|---|---|
| Coked briquets | 77.7 |
| Tar vapors, water of formation and gas | 22.3 |

The briquets leaving the shockheating zone through the opening 25 have been carbonized, freed of agglomerative tendencies and are at an elevated temperature in condition for the subsequent combined calcining and desulfurizing treatment of the present invention.

Figure 2:
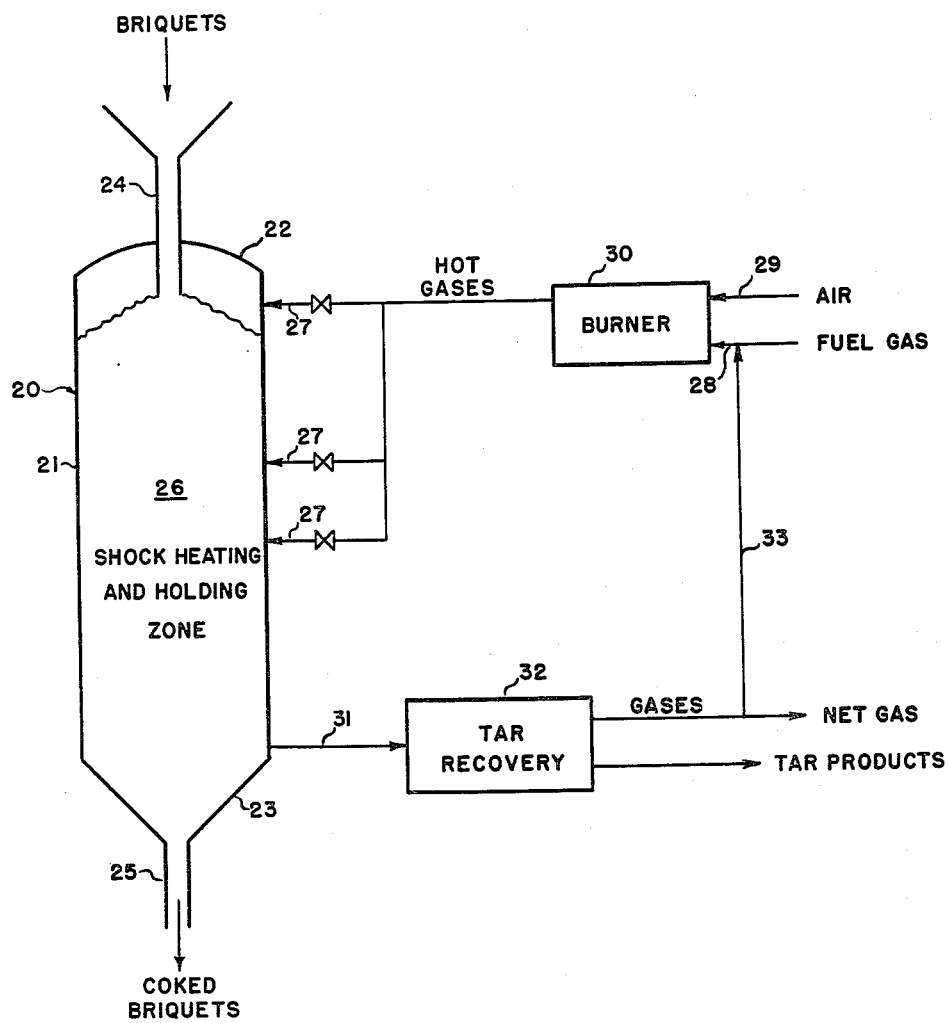
FIGURES 2 and 3 are schematic flow diagrams illustrating alternative methods for conducting the shockheating stage of the present invention described in connection with FIGURE 1.
Figure 3:
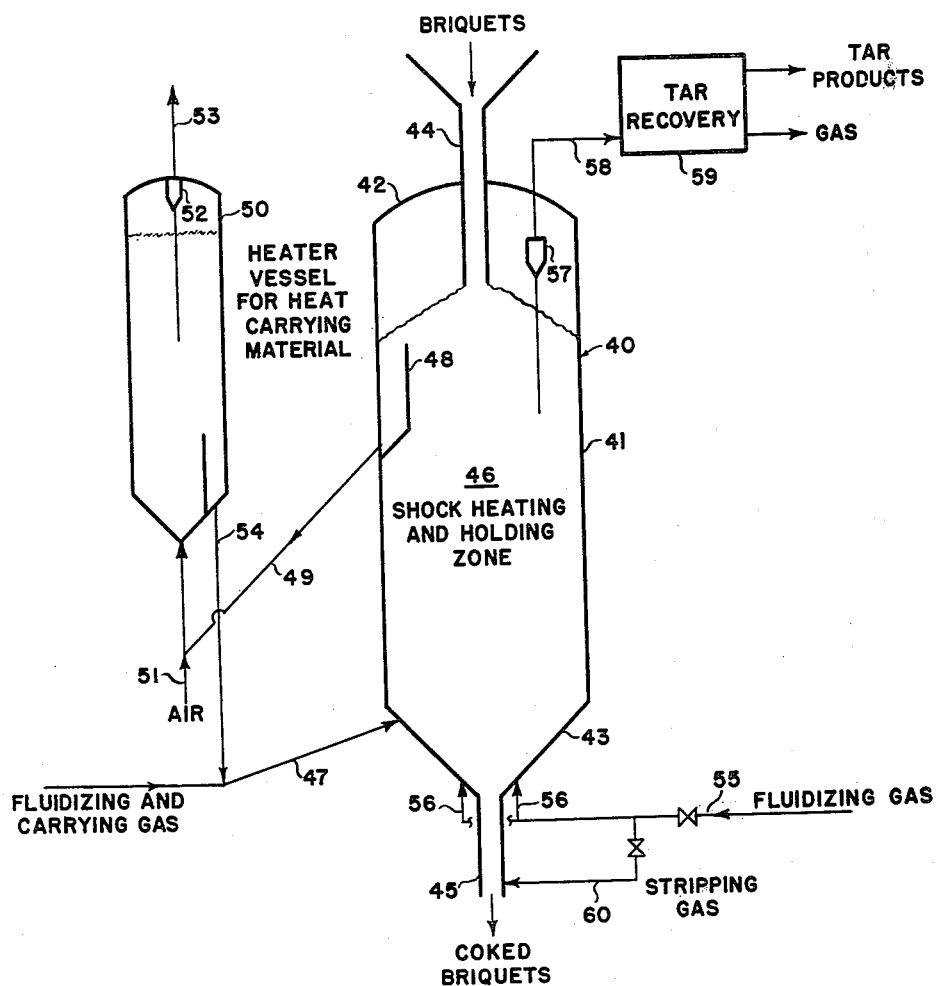

As an alternative to the embodiment illustrated in FIGURE 2, which employs hot gases to supply the heat requirements for the shockheating and holding zone, we may provide the apparatus illustrated in FIGURE 3 wherein the heat requirements are supplied by recirculating finely divided fluidizable heat-carrying material through the shockheating and holding zone. The finely divided fluidizable heat-carrying material preferably is finely divided sand or finely divided low temperature carbonization char.

As shown in FIGURE 3, a shockheating and holding vessel 40 is provided having vertical side walls 41, a top wall 42 and a bottom wall 43. An opening 44 is provided in the top wall 42 to permit introduction of briquets at a temperature below the plastic temperature of their coal constituent. An opening 45 is provided in the bottom wall 43 for discharging coked briquets from the vessel 40. The vessel 40 is adapted to confine a downwardly moving fixed bed 46 containing briquets in particle-to-particle contact. The vessel 40 is further adapted to confine a fluidized mass of heat-carrying material maintained in random motion through the interstices existing between the briquets under the influence of upwardly moving fluidizing gases. The heat-carrying material passes countercurrently to the moving bed of briquets. A complex flow pattern is established wherein a dense fluidized phase of heat-carrying material is maintained in the large void spaces between the briquets. Heat-carrying material is transferred between these small pseudo-fluidized beds as a disperse phase.

Heated heat-carrying material is introduced into the vessel 40 through a conduit 47 as a disperse phase suspended in an inert carrying gas. Upon entry into the vessel 40, the inert carrying gas becomes a portion of the fluidizing gas required to maintain the random motion of the fluidizable heat carrying material therein. An overflow weir 48 or similar apparatus is provided near the top of the vessel 40 to collect finely divided heat carrying material for recovery through conduit 49 and ultimately reheating in an external fluidized heating vessel 50. The heat carrying material is entrained in a stream of gas, preferably air, from a conduit 51 and introduced into the heating vessel 50 maintained at a temperature above the desired shockheating temperature of the vessel 40. The heat required for reheating the heat-carrying material may be supplied by passing hot gases through the heating vessel 50 or by burning a fuel within the vessel 50. The recirculating stream of heat-carrying material will contain a quantity of carbonaceous material abraded from the briquets which may be burned with air in the vessel 50 to supply the heat. If low temperature carbonization char is the heat-carrying material, it may be partially burned in the vessel 50 to supply the heat. This last-mentioned technique requires provision of a source of make-up char required to replace that lost by partial combustion. Sufficient carbonaceous material may be abraded from the briquet surfaces to provide a portion of the make-up char required to compensate the heat-carrying material destroyed by partial combustion.

A cyclone 52 is provided in the heating vessel 50 to separate entrained solids from the spent gases which are discharged through a conduit 53. Heated heat-carrying material is withdrawn from the heating vessel 50 through a conduit 54 and reintroduced into the shockheating and holding vessel 40 through the conduit 47 as described.

Additional fluidizing gas may be introduced into the shockheating and holding vessel 40 through a conduit 55 having a plurality of distribution inlets 56 through the bottom wall 43. A cyclone separator 57 is provided in the vapor space above the bed 46 to remove entrained solids from the spent gases and evolved tar vapors which are recovered virtually free of solids through a conduit 58 for recovery of valuable tar products and gases in a tar recovery zone 59.

Starting with briquets prepared as hereinbefore described, a typical distribution of the products of the shockheating and holding zone 40 is as follows.

Product: Weight percent
Coked briquets_____ 76.2
Tar vapors, water of formation and gas_____ 23.8

The heat-carrying material enters the shockheating and holding vessel 40 through the conduit 47 at a temperature of 1200 to 1500° F. The heat-carrying material leaves the shockheating and holding vessel 40 through the conduit 49 at a lower temperature, for example, 900 to 1250° F. The temperature differential between the heat-carrying material in the conduit 47 and in the conduit 49 will determine the quantity of heat-carrying material required to effect shockheating and coking of the briquets in the bed 46.

A small quantity of stripping gas is introduced into the discharge opening 45 through a conduit 60 to strip the finely divided heat-carrying material from the surfaces of the coked briquets being discharged through the opening 45.

We prefer to employ low temperature carbonization char produced by fluidized processes as the heat-carrying material since any adhesion of the solids on the surfaces of the briquets will not contaminate the ultimate product. However, even where sand is employed as the heat-carrying material, we have found that adhering particles of sand comprise less than one percent of the weight of product briquets.

We have found that a movement of about 2 to 5 pounds of fluidizable char per pound of briquet through the shockheating and holding vessel 40 is satisfactory for the shockheating requirements.

Figure 4:
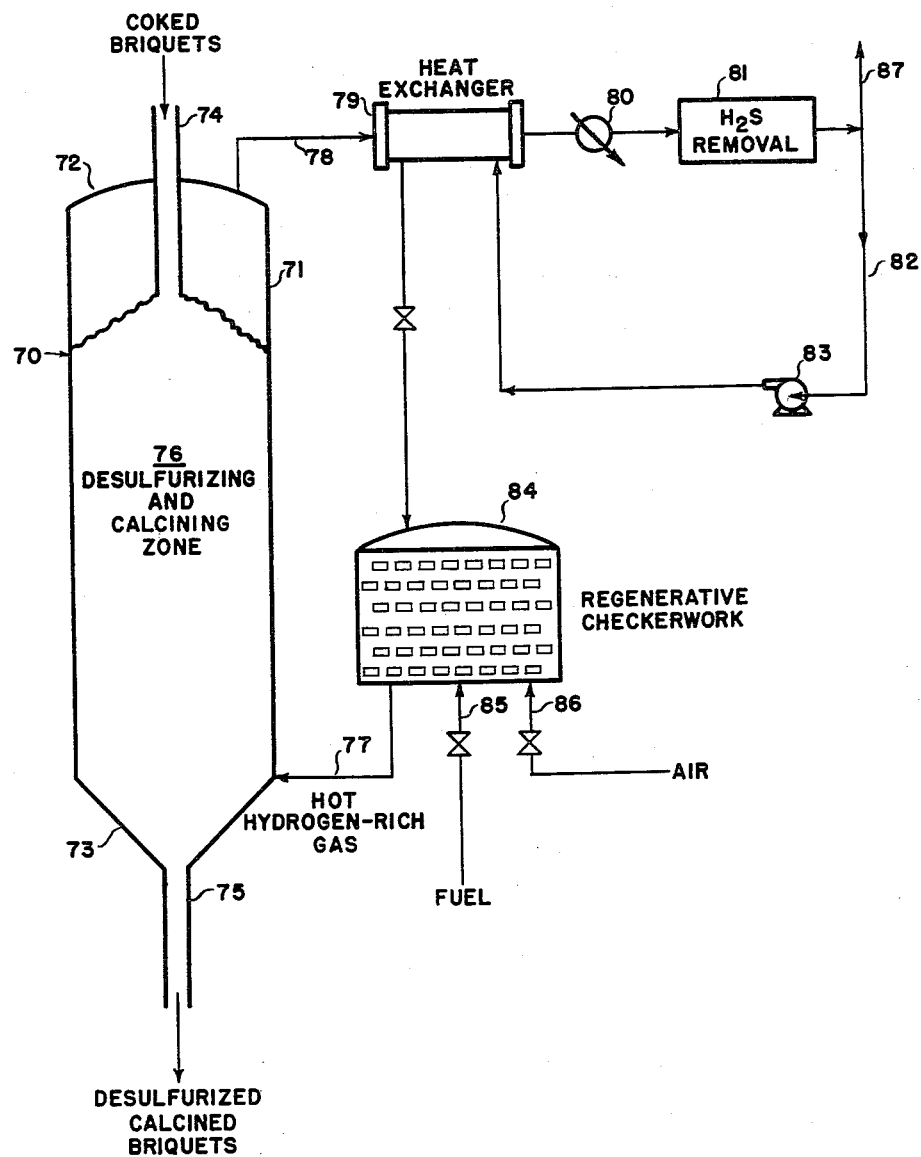
FIGURES 4 and 5 are schematic illustrations of alternative methods for conducting the combined calcining and desulfurizing treatments described in connection with FIGURE 1.

Referring now to FIGURE 4, we have illustrated apparatus suitable for conducting the calcining and desulfurizing treatment of the present process employing heated hydrogen gas as the heating agent and desulfurizing agent for the briquets. A calcining and desulfurizing vessel 70 is provided having vertical side walls 71, a top wall 72 and a bottom wall 73. An opening 74 is provided in the top wall 72 for introducing coked briquets at a shockheating temperature into the vessel 70. An opening 75 is provided in the bottom wall 73 for discharging calcined desulfurized briquets. The vessel 70 is adapted to confine a downwardly moving bed 76 of briquets in particle-to-particle contact. The briquets may be introduced into the vessel 70 through the opening 74 either continuously or batch-wise. A residence time of about one to three hours within the vessel 70 is preferred.

Heated hydrogen gas at a temperature of about 1600–1800° F. is introduced into the bottom of the vessel 70 through a conduit 77. The heating gas may include other non-oxidizing gases such as carbon monoxide and methane provided the partial pressure of hydrogen exceeds one atmosphere. The entering gas should be virtually free of hydrogen sulfide. Where, as illustrated in FIGURE 4, a direct gas calcining and desulfurizing system is employed, the partial pressure of hydrogen preferably is in excess of one atmosphere, for example, 3 to 10 atmospheres.

About 10 to 30 standard cubic feet of hydrogen are passed through the calcining and desulfurizing vessel 70 for each pound of briquets. The sensible heat of the gas is employed to raise the temperature of the briquets above 1550° F. In addition, the hydrogen reacts with the sulfur of the briquets to form hydrogen sulfide. The quantity of hydrogen required to effect desulfurization is more than sufficient to provide the sensible heat required for the calcining at readily attainable preheat temperature levels. In any event the quantity of hydrogen should be sufficient to effect desulfurization of the briquets without exceeding a volume ratio of $H_2S/H_2$ greater than 0.02 within the vessel 70. The desulfurizing duty of the hydrogen gas increases with increasing sulfur content of the briquets. The additional heating of the briquets in the vessel 70 results in further devolatilization and net production of hydrogen gas which may be retained and recirculated in the system for further processing of briquets.

Hydrogen gas passes upwardly through the briquet bed 76 and is removed through a conduit 78 from the top of the vessel 70. The gases are preliminarily cooled in a heat exchanger 79, further cooled in a cooler 80 and substantially freed of hydrogen sulfide content in an $H_2S$ removal system 81. The $H_2S$ removal system may employ, for example, the well-known diethanolamine process, a solid hydrogen sulfide acceptor process, or any convenient means.

Cooled hydrogen, virtually free of hydrogen sulfide, is recovered from the removal system 81 through a conduit 82, compressed to the desired pressure in a compressor 83, preliminarily heated by heat exchange in the exchanger 79, and introduced into a high temperature heater 84. The high temperature heater 84 is shown as a checkerwork regenerator which is well suited for the purpose. Fuel and air may be supplied to the heater 84 through conduits 85 and 86 respectively during off cycles in a well-known manner.

Net product gas containing hydrogen may be recovered through a conduit 87.

The desulfurizing action described in connection with FIGURE 4 corresponds in detail to that disclosed in the aforementioned U.S. Patent 2,717,868.

The following examples are illustrative of this invention, particularly with reference to a first aspect of the process of this invention. However, these examples are not intended to restrict the scope of this invention as previously described. Thus it will be readily apparent that those phases of the examples dealing with agglomerate preparation and shock-heating of briquets are generally equally applicable to the second aspect of this invention to be hereinafter described.

*Example I*

Briquets which were prepared as described from Arkwright coal, a typical Pittsburgh seam bituminous coal, contained 2.20 percent sulfur. The briquets had been prepared from the following formulation in cylindrical shapes, 2 inches diameter by 2⅜ inches high.

Ingredient: Percent by Weight
(a) Arkwright coal_____ 25.0
(b) Char produced by fluidized low temperature carbonization of Arkwright coal_____ 58.5
(c) Low temperature carbonization pitch____ 5.3
(d) High carbon content pitch_____ 6.2
(e) Recycle coke particles_____ 5.0

The briquets were shockheated and held at 950° F. in a fluidized bed of sand for 30 minutes. Thereafter the briquets were heated at about 6 to 8° F. per minute to a temperature of 1600° F. in an atmosphere of 30 p.s.i.g. hydrogen. The product briquet had a sulfur content of 1.24 percent after one hour exposure at 1600° F.

Example II

Briquets having one inch diameter were prepared from Arkwright coal and char obtained by fluidized low temperature carbonization of Arkwright coal in the proportions shown in Example I. The briquets contained 2.30 percent sulfur. Following shockheating at 1100° F. in a fluidized bed of sand, the briquets were retained at 1100° F. for 30 minutes and thereafter heated to 1600° F. at about 8 to 10° F. per minute. The briquets were retained at 1600° F. for one hour at a pressure of six atmospheres absolute of hydrogen gas. The product briquets had a sulfur content of 0.51 percent. The product briquets had a cold tumbler index, +½-inch (a measure of strength), of 83% which is considered good.

In place of Arkwright coal, an acceptable char possessing a desired bulk density of less than about 30 pounds per cubic foot may be prepared by the low temperature carbonization of a low volatile bituminous coal such as Pocahontas seam coal or from a high-sulfur medium volatile Kittanning seam coal.

Figure 5:
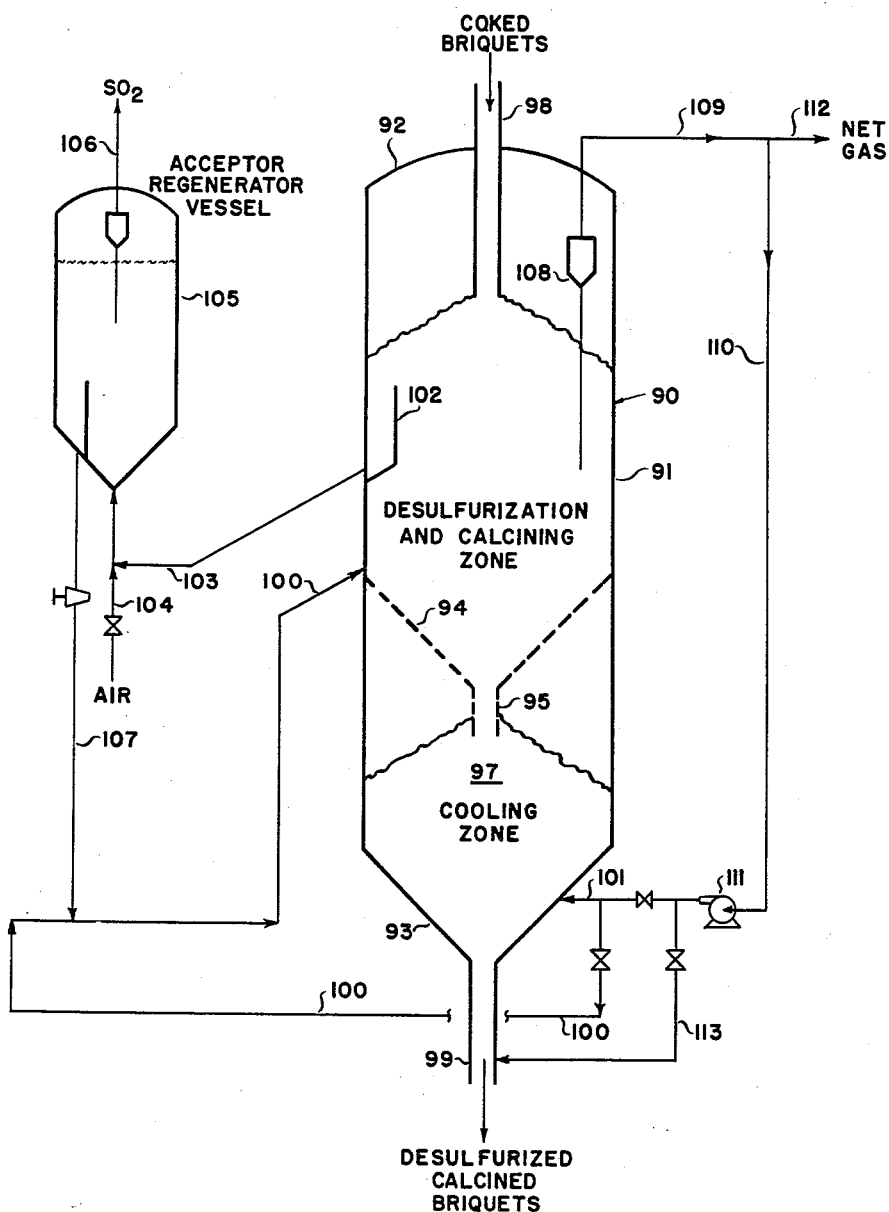

FIGURE 5 illustrates apparatus adapted for conducting the calcining and desulfurizing treatment according to the teachings of the aforementioned U.S. Patent 2,824,047. According to this alternative technique, finely divided particles of fluidizable solid materials (termed hydrogen sulfide acceptors) are used to supply the heat required for calcining and to remove hydrogen sulfide from the vapor phase to maintain the volume ratio of $H_2S/H_2$ at a low value. The acceptor solids preferably comprise lime or manganese oxide. The active ingredient of the acceptor solid may be impregnated upon abrasion resistant particles of refractory material.

As shown in FIGURE 5, a calcining and desulfurizing vessel 90 is provided having vertical side walls 91, a top wall 92 and a bottom wall 93. A conical grid element 94 having a central opening 95 is provided within the vessel 90 to separate its interior into an upper chamber 96 wherein calcining and desulfurizing occur and a lower chamber 97 wherein desulfurized calcined briquets are partially cooled and incoming hydrogen gas is preliminarily heated. An opening 98 is provided in the top wall 92 for introducing coked briquets at an elevated temperature into the vessel 90. An opening 99 is provided in the bottom wall 93 for discharging calcined desulfurized briquets. A downwardly moving bed of briquets is maintained in the chamber 96 in particle-to-particle contact. Finely divided fluidizable acceptor solids are introduced into the chamber 96 as a suspension in hydrogen gas through a conduit 100. Additional hydrogen gas for fluidizing and desulfurizing is introduced into the lower chamber 97 through a conduit 101. Under the fluidizing influence of upwardly moving hydrogen gas, the fluidizable acceptor solids are maintained in random motion through the interstices existing between the briquets in the chamber 96. An overflow weir 102 is provided in the upper portion of the chamber 96 for recovery of acceptor solids. Relatively cooled acceptor solids, containing sulfur which they have absorbed in the chamber 96 are recovered through a conduit 103 and, suspended in a stream of air from a conduit 104, are introduced into a regenerator vessel 105 for elimination of sulfur and reheating. Spent fluidizing gases containing sulfur dioxide are discharged from the vessel 105 through a conduit 106. Regenerated acceptor, at a temperature of about 1600 to 1800° F., is recovered through a conduit 107 for reintroduction into the treating chamber 96. The regenerated acceptor has renewed capacity for absorbing sulfur in the treating chamber 96.

Spent fluidizing gases comprising hydrogen are freed of entrained solids in a cyclone separator 108 provided in the vapor space above the treating chamber 96 and are recovered virtually free of solids through a conduit 109. The gases in conduit 109 are virtually free of hydrogen sulfide, i.e., they contain only that quantity of hydrogen sulfide which exists in equilibrium with the particular acceptor employed in the process. Hence the gases in the conduit 109 may be recycled directly through a conduit 110, repressurized in a compressor 111 and reemployed in the process. The net gases resulting from devolatilization of the coked briquets in the chamber 96 may be withdrawn through a conduit 112.

The briquet cooling chamber 97 serves for partially cooling the product briquets and partially preheating the hydrogen employed as fluidizing and treating gas. A small quantity of gas, e.g., hydrogen-rich gas, may be introduced through conduit 113 into the discharge opening 99 to strip product briquets of any adhering particles of the finely divided acceptor.

We have found that about 2 to 5 standard cubic feet of hydrogen per pound of briquets is satisfactory in this system. We have also found that when lime or manganese ore is employed as the acceptor solid, the desulfurizing capacity of the solid greatly exceeds the desulfurizing duty when the acceptor is employed in sufficient quantity to provide the heat necessary in the process.

Example III

Briquets were prepared as described in Example I. The sulfur content was 2.20 percent. The briquets were shockheated to 950° F. in a fluidized bed of sand and maintained at 950° F. for one-half hour. Thereafter the briquets were heated to 1350° F. and treated in the presence of fluidized acceptor solids with hydrogen gas as the fluidizing gas (superficial linear velocity of 0.4 foot per second) at a pressure of one atmosphere and at a pressure of three atmospheres. The acceptor solids were alumina pellets impregnated with 8 percent of manganese oxide. The sulfur content of the resulting formcoke is listed in Table I (A) for treatment at one atmosphere hydrogen pressure and three atmospheres hydrogen pressure.

Example IV

Briquets were prepared and treated as in Example III except that the desulfurization was carried out at 1450° F. The sulfur content of the resulting formcoke is listed in Table I (B) for treatment at one atmosphere hydrogen pressure and at three atmospheres hydrogen pressure.

TABLE I.—DESULFURIZATION OF BRIQUETS [1]

| Length of Treatment, Hours | Sulfur Content of Product Briquets, Weight Percent | |
|---|---|---|
| | At 1 atm. Hydrogen | At 3 atm. Hydrogen |
| (A) At 1,350° F.: | | |
| 1 | 1.56 | 1.29 |
| 2 | 1.27 | 1.05 |
| 3 | 1.00 | 0.62 |
| (B) At 1,450° F.: | | |
| 1 | 1.37 | 1.06 |
| 2 | 1.10 | 0.74 |
| 3 | 0.97 | 0.55 |

[1] In examples III and IV the combined desulfurization and calcining step was terminated at 1350° F. and 1450° F. respectively in a deliberate attempt to demonstrate the effect of temperature on the desulfurization phase alone. Hence Example III may be considered as including a partial desulfurization and partial calcining step whereas Example IV may be considered as including a desulfurization and partial calcining step.

Figure 6:
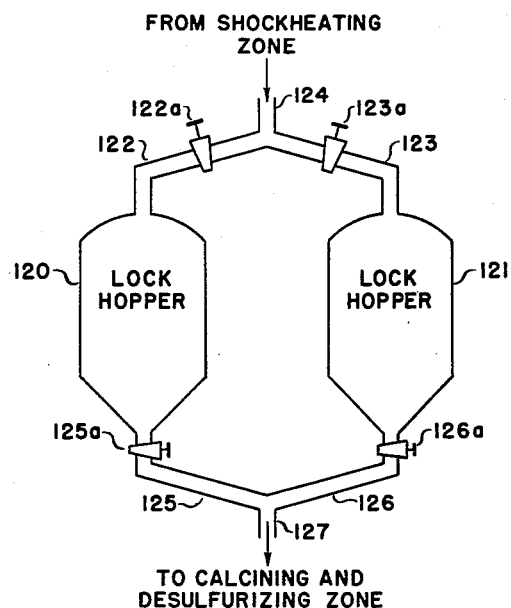
FIGURES 6 and 7 are schematic illustrations of apparatus suitable as pressure seals respectively preceding and following the desulfurizing and calcining treatment zone illustrated in FIGURE 1.

Referring now to FIGURE 6, we have illustrated a lock hopper system suitable for use as the pressure seal 15 illustrated in FIGURE 1. Such a lock hopper system would handle briquets being discharged from the shockheating and holding zone, as for example, through the opening 25 in FIGURE 2 or the opening 45 in FIGURE 3. The lock hopper system would provide briquets at an elevated pressure for introduction into the calcining and desulfurizing zone.

As shown in FIGURE 6, two lock hopper surge vessels 120 and 121 are provided having inlet conduits 122 and 123 respectively joining with a briquet inlet conduit 124. The lock hopper surge vessels 120 and 121 have briquet discharge conduits 125 and 126 respectively joining a conduit 127. Coked briquets at a shockheating temperature are introduced into the conduit 124 and are alternatively deposited in the surge vessel 120 or 121. When the vessel 120 is receiving briquets from the conduit 124, a valve 125a in conduit 125 and a valve 123a in conduit 123 are closed. During this time a valve 122a in conduit 122 and a valve 126a in conduit 126 are opened. Accordingly, the surge vessel 120 is maintained at the same pressure as the shockheating and holding zone. The surge vessel 121 is maintained at the same pressure as the calcining and desulfurizing zone. When the inventory of briquets in the surge vessel 120 is full and the inventory of briquets in the surge vessel 121 has been depleted, the valves 122a and 126a are closed and the valves 123a and 125a are opened for the alternative half-cycle.

Figure 7:
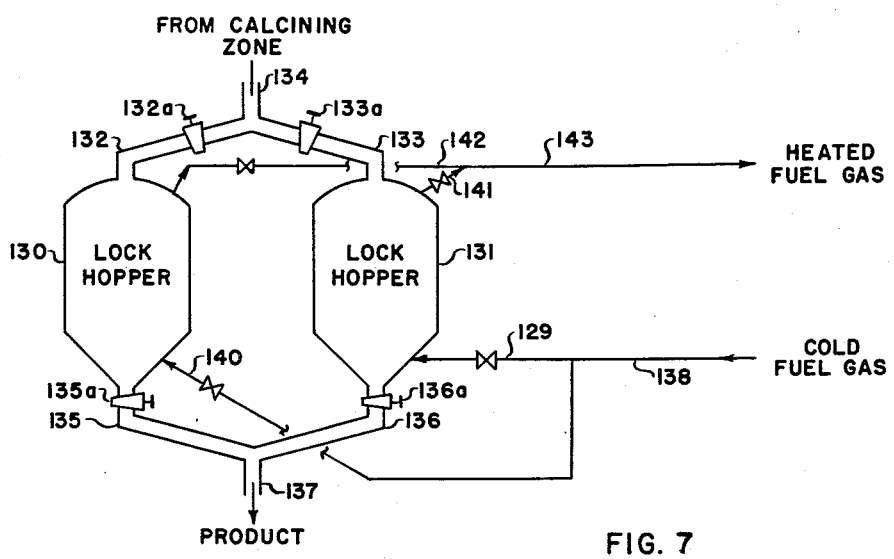

Referring to FIGURE 7, we have illustrated apparatus adapted to serve as a pressure seal 17 (FIGURE 1) between the calcining and desulfurizing zone and the cooling zone. Two lock hopper surge vessels 130 and 131 are provided having inlet conduits 132 and 133 respectively at their tops connected to a briquet conduit 134 and having discharge conduits 135 and 136 respectively connected to a briquet discharge conduit 137. The briquet conduit 134 would join, for example, the conduit 75 of FIGURE 4 or the conduit 99 of FIGURE 5. During one-half cycle a valve 132a in conduit 132 is open, a valve 133a is conduit 133 is closed, a valve 135a in conduit 135 is closed, and a valve 136a in conduit 136 is open. During this half-cycle briquets are discharged into the surge vessel 130 through the conduits 134 and 132. During the initial portion of this cycle a cool gas may be introduced from a manifold conduit 138 into the surge vessel 131 containing hot product briquets. The cool gas is itself heated by removing heat from the briquets and is recovered through conduits 141 and manifold conduit 143. Desirably a cool fuel gas may be employed for this purpose and be preheated for combustion thereby.

During the alternate half-cycles the valves 132a and 136a are closed and the valves 133a and 135a are open, thereby maintaining the superatmospheric pressure existing in the calcining and desulfurizing zone. Product briquets are recovered through the briquet discharge conduit 137.

It should be apparent that either of the embodiments of shockheating and holding treatment illustrated in FIGURES 2 and 3 may be employed with either of the embodiments of desulfurization and calcining treatment illustrated in FIGURES 4 and 5. Where higher pressures of hydrogen are employed, for example, six atmospheres or more for the desulfurization treatment, the treating gas preferably will contain substantial quantities of methane to avoid carbon loss from the briquets by hydrogenation.

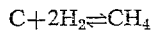

$$C + 2H_2 \rightleftharpoons CH_4$$

If sufficient methane is maintained in the recirculating gas stream, its presence will suppress the carbon hydrogenation reaction without adversely affecting the desired desulfurization reaction. The volume ratio of $CH_4/H_2$ preferably is from about 0.04 to 0.30.

II. SECOND ASPECT OF THIS INVENTION

In a preferred version of the simplified second aspect of this invention, the coal-char briquets are shock-heated and carbonized at a temperature in the range of 900 to 1250° F. They are next heated from a temperature below 1300° F. to a temperature above 1550° F. while feeding them at atmospheric pressure in a descending column in countercurrent relation to an upwardly moving stream of gas containing autogenous devolatilization gas. The total gas pressure is essentially atmospheric. Use of only the autogenous devolatilization gas at atmospheric pressure will effect substantial desulfurization. To increase the amount of desulfurization, a desulfurizing gas such as hydrogen may be externally fed to this system and recycled therein, even at substantially atmospheric pressure. Such a recycle technique will be effective only where the hydrogen sulfide that is formed is absorbed in situ by acceptors or is removed externally. However, in the simplest aspect of this invention, substantial desulfurization is obtained when the briquets are fed at atmospheric pressure in countercurrent relation to an internal upwardly moving gas stream consisting essentially of autogenous devolatilization gas. The briquets are then recovered as a low-sulfur calcined formcoke of metallurgical grade ideally suited for use in a blast furnace. By atmospheric pressure is meant ordinary ambient air pressure, which of course varies from day to day at the same location. In feeding the briquets to the system at atmospheric pressure, this means that the pressure will necessarily vary slightly at other points in the system because of pressure drops due to the passage of desulfurization gases through the system. Thus a pressure slightly in excess of atmospheric pressure will ordinarily exist at the point of withdrawal of the briquets from the system.

It is a surprising feature of this invention that substantial desulfurization is obtained in this process, even where the desulfurizing and calcining treatment is carried out without the use of any pressurized equipment, i.e., under atmospheric conditions, and without any external recycling of gas or external sulfur-removal steps. The process, in its simplest form, avoids any external feed of desulfurizing gas. It does not require the critical maintenance of a specific $H_2S/H_2$ ratio. Significant desulfurizing action occurs as a result of contact only with the internal autogenous devolatilization gas which is moving upwardly in countercurrent relation to the downwardly moving agglomerates. It has been surprisingly and unexpectedly found that, despite the consistent teaching contained in this long-established art to the effect that under coking conditions the sulfur content by weight of the coke will be from 80 to 100 percent of the sulfur content by weight of the starting coal, the present process yields a desulfurized formcoke having a sulfur content as low as 59 percent by weight compared with the percentage of sulfur in the coal-char feed. It is considered essential in effecting significant desulfurization by this second aspect of the process of this invention that the internal autogenous devolatilization gas not be diluted by inert gases. Thus the heat provided to the desulfurizing and calcining zone is supplied preferably by indirect means, i.e., by heating the walls of the vessel in which the reaction is to take place. Alternatively, this heat may be provided by transfer from circulating nonreactive solid particles such as char or sand as heat carriers. The use of inert flue gases to provide the heat for the desulfurizing and calcining zone is to be avoided because of their diluent effect on the autogenous devolatilization gas. If it is desired to use hot gases to provide the required heat in the desulfurizing and calcining zone, these gases must consist essentially of desulfurizing gases containing substantial quantities of hydrogen.

Figure 8:
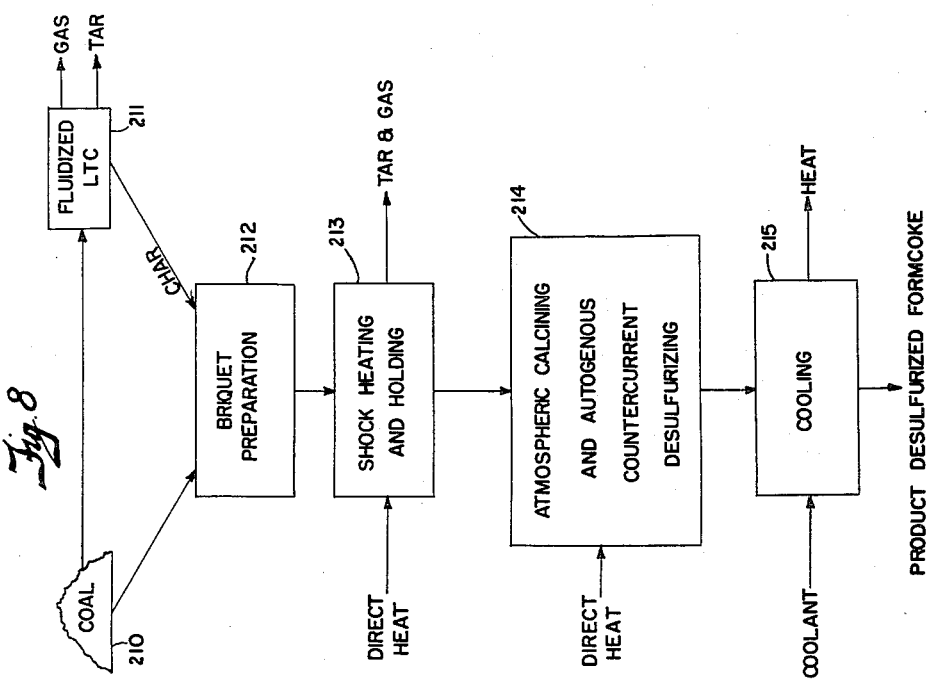
FIGURE 8 is a schematic flow diagram indicating the processing steps involved in a preferred embodiment of a second aspect of the present invention.

FIGURE 8 is directed to a preferred embodiment of a second aspect of the process of this invention in which the use of pressurized conditions or devolatilization gas recycle, as described in the first aspect of this invention, is avoided. Referring to FIGURE 8, high-sulfur caking coal from a source 210 is provided as starting material. This coal preferably has a sulfur content between about 1.6 and 2.2 percent by weight. A portion of the caking coal is processed via low-temperature carbonization in a zone 211 whereby the coal is converted into gas, tar, and char. With preferred fluidized low-temperature carbonization processes, the char particles have a bulk density of about 20 to 25 pounds per cubic foot. In general, the char is sufficiently finely divided as produced, to pass through a 14-mesh Tyler standard screen. Char produced by fluidized low-temperature carbonization permits the preparation of product metallurgical fuel having the strength and density corresponding to existing coke oven products. In addition the char produced by fluidized low-temperature carbonization is peculiarly amenable to the desulfurization treatment of the present invention. It is preferred that the carbonization be performed at a temperature not exceeding 1400° F. so as to have a subsequent maximum yield of devolatilization gas.

As schematically illustrated in FIGURE 8, the finely divided product char is blended with finely divided caking bituminous coal in a briquet preparation zone 212 wherein substantially uniform sized briquets are obtained. The coal employed in the briquet preparation may be the same coal which is employed in preparing the char via the low-temperature carbonization process. Alternatively, the coal employed in the briquets may be from a different source provided that the coal possesses highly caking properties. It is generally preferred that binder materials such as pitch be employed in the briquet preparation stage to introduce shape-retaining properties to the briquet prior to the subsequent processing.

The briquets are transferred from the briquet preparation zone 212 into a shock-heating and holding zone 213 for shock-heating whereby their surface is rapidly elevated, virtually instantaneously, to a temperature in the range of 900 to 1250° F. The surface of the briquets is maintained at a temperature of 900 to 1250° F. until the briquets attain throughout a temperature of 900 to 1250° F., thereby being carbonized.

The residence time of the briquets in the shock-heating and holding zone 213 is usually from about 30 to 60 minutes. The briquets must not be heated beyond the shock-heating temperature until their coal constituent has passed entirely through its plastic temperature range.

While some of the heat required in the shock-heating and holding zone may be supplied indirectly, preferably the bulk of the heat is provided directly either by means of hot gases in contact with the briquets or by circulation of finely divided heat-carrying solids.

The process thus far described with respect to the second aspect of this process is generally similar to that shown in FIGURE 1 with respect to the first aspect of this process. However the desulfurizing and calcining treatment of the coked briquets in this second aspect differs from the first aspect of the process with respect to the simplicity of procedure involved and the nonetheless substantial improvement in desulfurization obtained.

Referring again to FIGURE 8, it has been surprisingly found that the carbonized coal-char briquets from zone 213 may be simply treated at atmospheric pressure in the absence of gas recycle or acceptor recycle to provide a desulfurized formcoke having a sulfur percentage between 60 and 70 percent of that in the feed briquet. This is accomplished in the desulfurizing and calcining zone 214 by heating the carbonized briquets to a temperature from below 1300° F. to above 1550° F., preferably by indirect heating means, so that autogenous devolatilization gas is obtained. This gas consists principally of a mixture of hydrogen and methane. While being so heated, the briquets are fed in a descending column in countercurrent relation to the upwardly moving stream of autogenous devolatilization gas. No pressure equipment is used or required, the reaction being performed at atmospheric pressure.

Direct heat may be provided to the briquets without interfering with the desulfurization reaction where a heating gas consisting principally of hydrogen is used. However, inert heating gases may not be used to provide the required heat in the desulfurizing and calcining zone 214. Such gases will have a diluent effect with respect to the autogenous devolatilization gas, decreasing the desulfurization obtainable. The heat may also be supplied by transfer from unreactive solid particles as heat carriers. Furthermore, the volume ratio of $H_2S/H_2$ need not be maintained below 0.02. Even when the ratio is above this figure, the desulfurization is not suppressed. Because the total gas pressure is atmospheric, that of the hydrogen gas present will be less than one atmosphere. Also, recycle is not required in order to maintain the $H_2S/H_2$ ratio to a critical value, nor is it necessary to provide in situ solid acceptors for the hydrogen sulfide to provide this ratio. In general, the desulfurization process proceeds at an optimum rate in the temperature range 1300 to 1500° F. although desulfurization continues up to calcining temperatures of 1800° F. Rapid heating of the briquets to temperatures above about 1500° F. may adversely affect the attainable desulfurization reaction rate. Where desirable high strength in the solid products is sought, a final calcining temperature above about 1550° F. is required. Thus optimum results are obtained by conducting the desulfurization reaction principally while the briquets are being raised in temperature as they are moving downwardly in countercurrent relation to the upwardly moving devolatilization gas. A residence time of from one to about 2 hours at a temperature between 1300 and 1500° F. is considered sufficient to effect substantial desulfurization. A further residence time of between 30 minutes and about one hour at a temperature between 1550 and 1800° F. is sufficient to effect calcining and also some additional desulfurization. For optimum desulfurization, a total time of about four hours within the desulfurizing and calcining zone is preferred. The resultant calcined desulfurized briquets are gradually cooled directly by means of a coolant medium in a cooling zone 15. The cooling treatment is also conducted at atmospheric pressure. The preparation of the briquets and their thermal treatment regimen is more fully described in the applications Serial No. 635,277, filed January 22, 1957, now abandoned, and Serial No. 635,421, filed January 22, 1957, now U.S. Patent 3,018,227, both assigned to the assignee of this invention.

Figure 9:
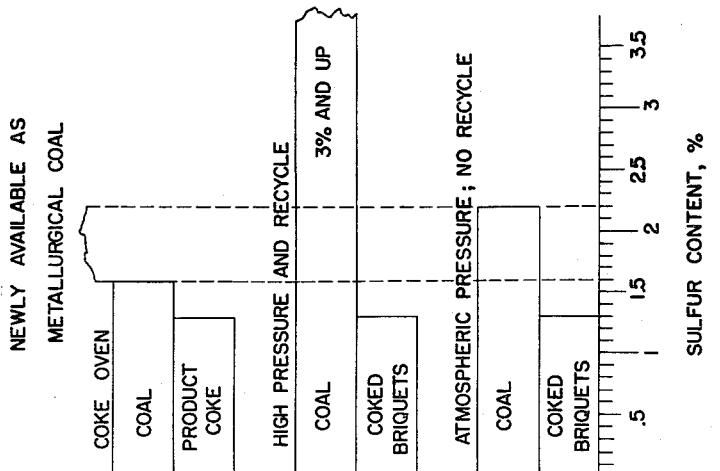
FIGURE 9 is a graphical comparison of the first and second aspects of our process with known processes.

Referring to FIGURE 9, a graphical comparison is shown of the desulfurization obtained with the two aspects of this process compared with that obtained in conventional high-temperature coke-oven processes. The two uppermost horizontal bars in FIGURE 9 show the improvement in sulfur content that may be expected in the carbonization of coal to produce product coke in conventional beehive and by-product coke ovens. In general, a sulfur content of 1.3 percent in the coke is considered the maximum permissible amount for use in the reduction of iron ore by conventional techniques in a blast furnace. Where the coke contains higher amounts of sulfur, then special desulfurization techniques applied to the hot metal after it leaves the blast furnace will be required.

In high-temperature coking, ordinarily up to about 45 percent of the sulfur present in the coal is evolved. The sulfur percentage of the coke corresponds to about 80 to 100 percent of the sulfur percentage of the coal prior to coking. Many attempts have been made to increase the desulfurization by causing a greater evolution of the sulfur in the volatile material, compared with the coke residue, during the coking process. Few if any practical results have been obtained from these extensive attempts. At present, as practiced on a commercial basis, the sulfur percentage of the high-temperature coke, on a weight basis, averages about 82 percent of that of the sulfur percentage of the coal from which it is derived. In studies made of commercial coking practices, it was found that the percentage of sulfur in dry coke could be represented by the following equation proposed by Lowry et al. (cited in previously mentioned "Coke Evaluation Project"):

(Sulfur in coke) = 0.084 + 0.759 (sulfur in coal)

Assuming a sulfur content in the coke of 1.3 percent as a maximum amount for metallurgical purposes, the maximum sulfur content of the coal is then 1.6 percent.

The central set of horizontal bars in FIGURE 9 shows the improvement that may be obtained when the first aspect of the process set forth herein is employed. In this first aspect of the process, coals having sulfur contents of 3 percent and higher may be successfully desulfurized. However, to achieve this marked reduction in sulfur content, superatmospheric conditions must be employed wherein the partial pressure of the hydrogen in the gas is greater than one atmosphere, and wherein the volume ratio of $H_2S/H_2$ is less than 0.02. Furthermore, recycle conditions and removal of sulfur either by use of acceptors or externally, are required to effect substantial reduction from high sulfur levels.

The lowest set of horizontal bars in FIGURE 9 shows the specific area for which the second aspect of the process of the present invention, uniquely adapted. Employing the second aspect of the process of the present invention, desulfurized form coke having a sulfur content of 1.3 percent or lower may be obtained starting with a caking coal having a sulfur content as high as 2.2 percent, or even higher where the char is preliminarily desulfurized. Thus this second aspect of the process is particularly useful and preferred where the sulfur content of the starting coal is not greatly in excess of 2.2 percent, and where a reduction of 60 to 70 percent in the sulfur content of the coal-char aggregates is sufficient.

In practicing this second aspect of the process of the present invention, there is effectively made newly available as metallurgical coal those coals having a sulfur content between 1.60 and 2.2 percent or higher. Inasmuch as low-sulfur coals, i.e., those having a sulfur content below 1.6 percent are becoming scarcer, this becomes a significant contribution in effectively providing newly available metallurgical coking coal reserves. In following this second aspect of the process of this invention as illustrated in the embodiment of FIGURE 8, starting with a coal having a sulfur content, for example, of 2.2.–2.4 percent, a char is obtained having approximately 90–100 percent of the percentage sulfur content of the starting coal. Thus a char having a sulfur content of approximately 2.2 percent is obtained. The briquets formed by blending the coal and char with pitch and breeze coke are still lower in sulfur content than the starting coal because of the low-sulfur content of the added pitch and breeze coke. After treatment according to the embodiment of this invention as illustrated in FIGURE 8, product desulfurized formcoke having a sulfur content of approximately 1.3 percent by weight is obtained.

In FIGURE 10 is illustrated an indirectly heated retort adapted to the practice of the aspect of this invention illustrated in FIGURE 8, particularly for the treatment of prior carbonized agglomerates. Briquets that have been shock-heated and held for a suitable period of time are placed in feed hopper 216. The wall 217 of the furnace is made of a suitable refractory material such as silica brick or carborundum brick in order to withstand the high temperature required. The desulfurizing and calcining zone 218 of the furnace is conveniently heated by incandescent gas which may be fed through burner ports 219, as shown. The carbonized briquets contained in hopper 216 are fed into zone 218 where they are brought to an ultimate temperature above 1550° F. As the coal-char agglomerates are gradually fed in a downward direction, increasing in temperature from below 1300° F. to above 1550° F., autogenous gas is evolved. This gas, which is generated by the aforesaid heating of the coal-char particles, rises in a countercurrent direction to the movement of the feed, being at atmospheric pressure, and is removed through vent 220. The gas used to keep the furnace at temperature is vented through stack 221. Thermocouples 222 are maintained throughout various critical areas of the furnace for controlling the temperature therein. The lower portion 223 of the furnace is cooled by circulating cooling water through jacket 224. The cooled desulfurized briquets collect in this lower portion and may be removed through gate 225.

In FIGURE 11 is shown a schematic view of a unitary furnace adapted for converting uncarbonized agglomerates to desulfurized formcoke in accordance with the aspect of the present invention illustrated in FIGURE 8. Uncarbonized briquets 226 are fed into a shock-heating and holding zone 227 which is directly heated by hot flue gas fed through a conduit 228. Cooled flue gas and minor amounts of volatile coke products are removed through a conduit 229. The desulfurizing and calcining zone 230 is indirectly heated as the briquets are passed downwardly through the furnace. A high B.t.u. content gas and other volatile coke products are evolved through conduit 231. The desulfurizing and calcining zone 230 is maintained at atmospheric pressure, and the evolved autogenous gas generated serves as a desulfurizing gas by passing in a counter-current upwardly moving direction with respect to the downwardly moving coked briquets, which are being heated from a temperature below 1300° F. to above 1550° F. The product desulfurized formcoke is collected after passing through cooling zone 232.

A. DESULFURIZATION OF BRIQUETS

*Step 1—Briquet preparation.*—While this invention is broadly directed to the desulfurization of coal-char agglomerates composed of bituminous coal and low-density char prepared by the low-temperature carbonization of bituminous coal, in its preferred aspects it is particularly suitable to the desulfurization of briquetted agglomerates which are formed from a mixture of a caking bituminous coal and fluidized low-temperature carbonization char. The char in its preferred form is finely divided and has a bulk density less than about 30 pounds per cubic foot, being obtained by the low-temperature carbonization under fluidized conditions of, preferably, a high-volatile caking coal. The caking coal used for preparing char is conveniently used for blending therewith. In the copending application of K. Baum and R. J. Friedrich, Serial No. 635,421, filed January 22, 1957, now U.S. Patent 3,018,227, and assigned to the assignee of this application, are described methods for preparing briquets particularly suitable for use in the practice of this invention. A particularly preferred briquet formulation comprises at least three ingredients which include a caking bituminous coal, a low-temperature carbonization char that has been obtained by the fluidized low-temperature carbonization of a caking bituminous coal, and a pitch binder obtained by the pyrolytic treatment of carbonaceous solid fuels, at least a portion of which has a fixed carbon content exceeding 25 percent. This mixture of starting materials is blended, kneaded and briquetted under pressure to uniform shape. Such briquets possess a satisfactory raw strength which is necessary to permit their being handled and moved in coking apparatus. Various shapes of briquets may be used depending upon the temperature, treatment and the type of furnace employed. Briquets which are dished, spheroidal, egg-shaped (prolate spheroids) lenticular, gibbous or cylindrical in form may be employed. A particularly preferred briquet formulation consists of: 25 percent of a high-volatile caking bituminous coal, 58.5 percent char prepared by the fluidized low-temperature carbonization of the foregoing coal, 6.2 percent recycle pitch, 5.3 percent pitch obtained from the low-temperature carbonization of bituminous coal and 5.0 percent recycle coke breeze. In general, it has been found that increasing the char content and lowering the coal content results in a weakening of the briquet. However, it has been found that briquets having a tumbler index strength in excess of 90 percent may still be obtained where a formulation such as one containing 15 percent coal, 68.5 percent char, 5.0 percent recycle coke, 6.2 percent recycle pitch and 5.3 percent low-temperature carbonization pitch is employed. The tumbler index was obtained by a tumbler test which is a modified form of the standard tumbler test for coke (ASTM D294-50). Normal by-product oven coke shows a tumbler index by our method in the range 88–94. In general, the coal content should not fall below 10 percent nor the char content exceed 90 percent by weight of the formulation. The use of some pitch as a binder is usually required, and this may vary from about 5 to 15 percent by weight of the total formulation.

*Step 2—Shock-heating and holding.*—After the briquets have been prepared, they are passed to a shock-heating and holding zone, which treatment is essential for imparting the desired strength to these briquets. This shock-heating and holding treatment is described in the copending application of R. J. Friedrich et al., Serial No. 635,277, filed January 22, 1957, now abandoned, and assigned to the assignee of this application. In this step, which is schematically shown in FIGURE 8 as shock-heating and holding step 213, it is essential that the surface of the briquets be heated to a temperature in the range of 900 to 1250° F. as rapidly as possible, virtually instantaneously. This step, referred to as shock-heating, has been found essential to impart the desired strength to the subsequently produced formcoke. After the shock-heating, the surface is maintained at a temperature of 900 to 1250° F. until the briquets throughout have attained this temperature. The residence time of the briquets may be varied from about 15 minutes to 2 hours, with a residence time of 30 to 60 minutes usually sufficient. A shock-heating temperature of 1000° F., followed by holding at this temperature for a period of 45 minutes is preferred for obtaining formcoke having maximum physical strength as determined by tumbler index measurement. If the residence time is too short, further treatment will subsequently introduce severe cracks and fissures into the briquets resulting in a shattered product. In general, as the dimensions of the briquets are increased, the residence time in the shock-heating and holding zone should increase.

The heat required in the shock-heating and holding zone may be supplied indirectly, although generally it is preferable to provide the bulk of the heat either by means of hot gases or by circulation of finely divided heat-carrying solids, such as char particles. In its preferred aspects, the steps of briquet preparation and shock-heating and holding generally correspond to those described herein with respect to practicing a first aspect of the process of this invention.

*Step 3—Autogenous countercurrent desulfurizing and calcining.*—After the briquets have been shock-heated and held, they are treated in accordance with the second aspect of this invention by raising them from a temperature below 1300° F. to a temperature above 1550° F. while feeding them at atmospheric pressure in a descending column in countercurrent relation to an upwardly moving stream of gas comprising autogenous devolatilization gas. In the specific runs shown in Table III, the gas stream consisted solely of autogenous devolatilization gas. In order to obtain maximum desulfurization, the carbonized briquets were gradually raised in temperature at a rate of about 3 to 5° per minute and then held at a calcining temperature of 1800° F. for approximately 30 minutes. Thus where carbonization was accomplished at 1100° F., approximately 4 hours was required to raise the briquets from this temperature a calcining temperature of 1800° F.

The unique nature of the desulfurization obtainable in the practice of the second aspect of this invention is strikingly illustrated by comparison with the conventional results obtained (Table II) when coal-char briquets were heated under standard fixed-bed conditions for both the shock-heating and the calcining. The briquet feed used for the runs shown in Table II consisted of a standard coal-char formulation consisting of 25 percent coal, 58.5 percent low-temperature carbonization char, 5.3 percent low-temperature carbonization pitch, 6.2 percent high-temperature pitch and 5.0 percent recycle coke. The same fixed-bed coking conditions were used for all briquets tested. They were shock-heated to a temperature of 1100° F., held at this temperature for 45 minutes, raised to a temperature of 1700° F. at a rate of 10° F. per minute, and then held at 1700° F. for one-half hour. The results for three different types of coal evaluated are shown in Table II.

TABLE II

| Coal [1] | Montourten | Moundsville | Arkwright | Arkwright coal and partially desulfurized Arkwright char |
|---|---|---|---|---|
| Percent S, raw briquets | 1.28 | 3.80 | 2.12 | 1.43 |
| Percent S, coked briquets | 1.10 | 3.39 | 1.97 | 1.45 |
| Ratio, coked S/raw S | 0.86 | 0.89 | 0.93 | 1.01 |

[1] All coals used are Pittsburgh-seam, high-volatile caking bituminous coals.

It is noted that the ratio of sulfur in the coked briquets to that in the starting briquets is approximately that obtained in a standard by-product oven. It was also noted that when the char was preliminarily desulfurized before being incorporated into the briquets, a treatment that usually results in stronger product formcoke, essentially no reduction in sulfur content was obtained.

In Table III are shown runs performed in accordance with the second aspect of the process of this invention, using an upwardly moving gas stream of only autogenous devoiatilization gas at atmospheric pressure fed in continuous countercurrent relation to a descending column of briquets.

TABLE III

| Run No. | Feed Composition | Shock Heat Temperature, °F. | Holding Period (min.) | Final Calcination, °F. | Tumbler Index of Product Coke | S Content of Raw Briquet | S Content of Formcoke | Ratio: S Formcoke/ S Raw Briquet |
|---|---|---|---|---|---|---|---|---|
| 1 | A | 1,000 | 45 | 1,800 | 88.1 | 3.52 | 2.13 | .605 |
| 2 | A | 1,000 | 30 | 1,850 | 88.6 | 3.55 | 2.10 | .592 |
| 3 | A | 1,100 | 45 | 1,800 | 89.0 | 3.34 | 2.09 | .626 |
| 4 | A | 1,000 | 45 | 1,600 | 86.8 | 3.49 | 2.45 | .716 |
| 5 | A | 1,000 | 45 | *1,800 | 86.8 | 3.49 | 2.45 | .702 |
| 6 | B | 1,000 | 45 | 1,800 | 90.4 | 3.52 | 2.15 | .611 |
| 7 | C | 1,050 | 45 | 1,800 | 93.5 | 1.69 | 1.14 | .675 |

*Rapid calcining: 1100–1800° F. in ca. 2 hours. Other runs: 1100–1800° F. in ca. 4 hours.
A: 25.0 percent Arkwright coal (2.63% S), 58.5 percent Moundsville low-temperature-carbonization char (4.24% S), 5.3 percent low-temperature-carbonization pitch, 6.2 percent coke-oven pitch and 5.0 percent recycle coke.
B: 25.0 percent Arkwright coal, 58.5 percent Moundsville low-temperature-carbonization char, 2.3 percent low-temperature-carbonization pitch, 9.2 percent recycle pitch and 5.0 percent recycle coke.
C: 25.0 percent Arkwright coal, 61.5 percent partially desulfurized low-temperature Arkwright char (treated at 1,350° F.) (1.45% S), 2.3 percent low-temperature-carbonization pitch, 9.2 percent recycle pitch, and 2.0 percent recycle coke.

As may be seen from Table III, substantial and significant reductions in the percentage sulfur content of the product formcoke compared with the percentage sulfur content of the coal-char feed were obtained in all instances, ratios as low as 59 percent being obtained. It is further significant to note that even where a preliminarily partially desulfurized char was used, substantial reductions were still obtained. It was found that where a partially desulfurized char was used, a tumbler index for product coke of 93.5 percent was obtained, which corresponds to a formcoke of substantially greater strength than one prepared from a char which had not been preliminarily desulfurized. This preliminary desulfurization is readily accomplished by treatment of the char with devolatilization gas under fluidized conditions as shown, for example, in U.S. Patent 2,717,868.

The autogenous devolatilization gas produced during the desulfurizing and calcining step, caculated on a nitrogen and hydrogen sulfide-free basis, had an average composition as follows:

| | Percent |
|---|---|
| Hydrogen | 70.2 |
| Methane | 17.3 |
| Carbon monoxide | 11.7 |
| Carbon dioxide | 0.8 |
| Ethane | 0.06 |

The gases were determined chromatographically, with the exception of hydrogen. Inasmuch as the total pressure of the devolatilization gas used was substantially atmospheric, the partial pressure of the hydrogen in the gas was well below one atmosphere.

In general, the coal-char agglomerates are preferably formed by briquetting techniques followed by heat treatment of these briquets as previously described. However, the use of coal-char agglomerates formed by hot-tumbling is also contemplated as within the scope of this invention.

B. DESULFURIZATION OF HOT-TUMBLED AGGLOMERATES

In a typical run for preparing hot-tumbled agglomerates, a feed was prepared consisting of equal parts by weight of finely divided high-volatile coal and fluidized low-temperature carbonization char. These were blended together for twenty minutes in a twin-shell blender. The mixed feed was then withdrawn and placed in a kiln having a 14-inch internal diameter. The temperature was gradually raised, ten minutes being required to raise the temperature from 700° F. to 800° F., the latter temperature being the preferred carbonization temperature in that hot-tumbled agglomerates carbonized at this temperature yielded formcoke of maximal strength. A residence time of ten minutes at 800° F. was maintained. Particles of ½-inch by ¾-inch size were obtained. The hot-tumbled agglomerates were calcined at 1800° F. and yielded a formcoke having a tumbler index of 97.0. Thus the formcoke obtained from the hot-tumbled coal-char agglomerates showed a somewhat better strength than conventional high-temperature metallurgical coke.

Where hot-tumbled coal-char agglomerates are used as feed in the process of this invention, it is preferred that they be carbonized during the hot-tumbling process itself, i.e., by heating to a minimum temperature between 800 and 900° F. The carbonized agglomerates may then be fed at atmospheric pressure directly into zone 214 for desulfurizing and calcining in a countercurrent autogenous gas stream, as described with respect to the briquets. Where the hot-tumbled agglomerates are not substantially carbonized during forming i.e., they are formed at tumbling temperatures below 800° F., then they are first fed into zone 213 for treatment therein in a similar manner to the carbonization treatment for the briquets, and are then fed to zone 214. In preparing the hot-tumbled agglomerates, a char content of about 30 to 70 percent by weight of the coal-char blend is suitable. The carbonized agglomerates, either carbonized in zone 213 by a shock-heating and holding treatment or kiln-carbonized during the hot-tumbling, may be used as a feed in hopper 216 to the retort illustrated in FIGURE 10. In uncarbonized form, they may be fed to the unitary furnace illustrated in FIGURE 11.

While this invention is primarily directed to the production of low-sulfur formcoke of metallurgical grade for reducing iron ores in a blast furnace, the formcoke produced may be used in other applications. Where a high order of physical strength is not an essential requirement, the production of desulfurized formcoke in accordance with this process need not be carried beyond the desulfurization stage, namely at a temperature above 1500° F. Such desulfurized but not substantially calcined formcoke can be used in non-ferrous metallurgy, in shallow-bed reduction, in electric furnace smelting, in phosphorus reduction furnaces or the like.

It is further recognized that various modifications may generally be made with respect to the processing of the coal-char feed in the step of agglomeration, whether by briquetting or hot-tumbling, and in the step of shock-heating and holding. Several such modifications are shown in the copending applications previously referred to. However, this invention is particularly directed to a desulfurization process for blends of bituminous coal and low temperature carbonization char wherein carbonized agglomerates are desulfurized and calcined either under pressurized conditions with recycle or under atmospheric conditions when moving in continuous countercurrent relation to an autogenous devolatilization gas. Various combinations of these two aspects of our process may also be utilized. By the process of this invention there is now produced formcoke of acceptable metallurgical grade for use in a blast furnace utilizing coals heretofore unavailable for use as metallurgical coals. It will of course be understood that other modifications of this invention will also suggest themselves to those skilled in this art with respect to the combination of steps shown, in addition to those specifically illustrated herein. Accordingly, the scope of this invention is to be determined in accordance with the objects and claims thereof.

The embodiments of the invention in which an exclusive property or privilege is claimed are defined as follows:

1. The method for preparing low-sulfur calcined formcoke of metallurgical grade which comprises heating coal-char agglomerates, including caking bituminous coal and low-density char obtained by a low temperature carbonization below 1400° F. of caking bituminous coal, the char content of the coal-char agglomerates being at least 40 percent by weight thereof, at a carbonization temperature not greater than 1250° F. to carbonize the agglomerates, heating the carbonized agglomerates from a temperature below 1300° F. to a temperature above 1550° F. while feeding them at least at atmospheric pressure in a descending column in countercurrent relation to an upwardly moving stream of gas consisting principally of hydrogen, whereby desulfurization and calcining of the agglomerates are effected, and recovering the agglomerates as low-sulfur calcined formcoke of metallurgical grade.

2. The method for preparing low sulfur calcined formcoke which comprises preparing briquets including (a) char having a low bulk density and obtained via low temperature carbonization of bituminous coal, and (b) caking bituminous coal, virtually instantaneously heating the surface of said briquets to a temperature in the range 900 to 1250° F., maintaining the surface at a temperature of 900 to 1250° F. until the briquets attain a temperature above 900° throughout, thereafter heating said briquets to a temperature above 1550° F., in the presence of a gas having a partial pressure of hydrogen greater than one atmosphere and having a volume ratio of $H_2S/H_2$ less than 0.02, separately recovering said gas and said briquets, and recovering low sulfur calcined formcoke.

3. The method according to claim 2 wherein said briquets include (a) char having a bulk density less than about 30 pounds per cubic foot and obtained by a fluidized low temperature carbonization of high volatile bituminous coal and (b) caking high volatile bituminous coal.

4. The method for preparing low sulfur calcined formcoke which comprises preparing briquets including (a) char having a bulk density less than about 30 pounds per cubic foot and being obtained via fluidized low temperature carbonization of high volatile coal, and (b) caking high volatile coal, virtually instantaneously heating the surface of said briquets by direct contact with a heating medium to a temperature in the range 900 to 1250° F., maintaining said surface at a temperature of 900 to 1250° F. until the briquets attain a temperature above 900° throughout, thereafter heating said briquets to a temperature above 1550° F., in the presence of a gas having a partial pressure of hydrogen greater than one atmosphere and having a volume ratio of $H_2S/H_2$ less than 0.02, and separately recovering said gas and said briquets, thereafter cooling said briquets to a temperature below about 600° F. and recovering low sulfur calcined formcoke.

5. The method for preparing low sulfur calcined formcoke from high sulfur high volatile caking coal which comprises subjecting a portion of said coal to low temperature carbonization under fluidized conditions to prepare a finely divided char having a bulk density less than about 30 pounds per cubic foot, mixing a portion of said char with a portion of said coal and preparing briquets from the resulting admixture, virtually instantaneously heating the surface of said briquets to a temperature in the range 900 to 1250° F., maintaining said surface at a temperature of 900 to 1250° F. until the briquets attain a temperature above 900° throughout, thereafter heating said briquets to a temperature above 1550° F., in the presence of a gas having a partial pressure of hydrogen greater than one atmosphere and having a volume ratio of $H_2S/H_2$ less than 0.02, and separately recovering said gas and said briquets, thereafter cooling said briquets to a temperature below about 600° F. and recovering low sulfur calcined formcoke.

6. The method for preparing low sulfur calcined formcoke which comprises preparing high sulfur briquets including (a) char having a bulk density less than about 30 pounds per cubic foot and being obtained via fluidized low temperature carbonization of high volatile coal, and (b) caking high volatile coal, virtually instantaneously heating the surface of said briquets to a temperature in the range 900 to 1250° F., maintaining said surface at a temperature of 900 to 1250° F. for 30 to 60 minutes until the briquets attain a temperature above 900° throughout, thereafter heating said briquets for one to three hours to a temperature above 1550° F., in the presence of a gas having a partial pressure of hydrogen greater than one atmosphere and having a volume ratio of $H_2S/H_2$ less than 0.02, and separately recovering said gas and said briquets, thereafter cooling said briquets to a temperature below about 600° F. and recovering low sulfur calcined formcoke.

7. The method for preparing low sulfur calcined formcoke which comprises preparing briquets including (a) char having a bulk density less than about 30 pounds per cubic foot and being obtained via fluidized low temperature carbonization of high volatile coal, and (b) caking high volatile coal, introducing said briquets into a shockheating and holding zone, introducing finely divided fluidized heat carrier medium into said shockheating and holding zone, introducing fluidizing gases into said shockheating and holding zone to maintain said heat carrier medium under fluidizing conditions surrounding briquets confined therein to provide virtually instantaneous heating of the surface of said briquets to a temperature in the range 900 to 1250° F. and to maintain said surface at a temperature of 900 to 1250° F. until the briquets attain a temperature above 900° throughout, recovering from said shockheating and holding zone evolved tar vapors and hydrocarbon-rich gas along with fluidizing gases, separately recovering said heat carrier for reheating thereof and separately recovering coked briquets, introducing said coked briquets into a combined desulfurizing and calcining zone and heating said briquets therein to a temperature above 1550° F., in the presence of a gas having a partial pressure of hydrogen greater than one atmosphere and having a volume of $H_2S/H_2$ less than 0.02, separately recovering said gas and said briquets, thereafter cooling said briquets to a temperature below about 600° F. and recovering low sulfur calcined formcoke.

8. The method for preparing low sulfur calcined formcoke which comprises preparing briquets including (a) char having a bulk density less than about 30 pounds per cubic foot and being obtained via fluidized low temperature carbonization of high volatile coal, and (b) caking high volatile coal, introducing said briquets into a shockheating and holding zone, passing hot gases into said shockheating and holding zone to provide virtually instantaneous heating of the surface of said briquets to a temperature in the range 900 to 1250° F. and to maintain said surface at a temperature of 900 to 1250° until the briquets attain a temperature above 900° throughout, recovering from said shockheating and holding zone evolved tar vapors and hydrocarbon-rich gases and separately recovering coked briquets, introducing said coked briquets into a combined desulfurizing and calcining zone and heating said briquets therein to a temperature above 1550° F., in the presence of a gas having a partial pressure of hydrogen greater than one atmosphere and having a volume ratio of $H_2S/H_2$ less than 0.02, separately recovering said gas and said briquets, thereafter cooling said briquets to a temperature below about 600° F. and recovering low sulfur calcined briquets.

9. The method for preparing low sulfur calcined formcoke which comprises preparing briquets including (a) char having a bulk density less than about 30 pounds per cubic foot and being obtained via fluidized low temperature carbonization of high volatile coal, and (b) caking high volatile coal, virtually instantaneously heating the surface of said briquets to a temperature in the range 900 to 1250° F., maintaining said surface at a temperature of 900 to 1250° F. until the briquets attain a temperature above 900° throughout, thereafter introducing said briquets into a desulfurizing and calcining zone, introducing into said desulfurizing and calcining zone a heating gas substantially free of $H_2S$ and containing sufficient hydrogen to maintain therein a partial pressure of hydrogen greater than one atmosphere at a rate of from 5 to 30 standard cubic feet of hydrogen for each pound of briquets entering said desulfurizing and calcining zone, said heating gas having sufficient sensible heat to raise the temperature of briquets in said desulfurizing and calcining zone above 1550° F., separately recovering said gas and said briquets, thereafter cooling said briquets to a temperature below about 600° F. and recovering low sulfur calcined formcoke.

10. The method for preparing low sulfur calcined formcoke which comprises preparing briquets including (a) char having a bulk density less than about 30 pounds per cubic foot and being obtained via fluidized low temperature carbonization of high volatile coal, and (b) caking high volatile coal, virtually instantaneously heating the surface of said briquets to a temperature in the range 900 to 1250° F., maintaining said surface at temperature of 900 to 1250° F. until the briquets attain a temperature above 900° throughout, thereafter introducing said briquets into a desulfurizing and calcining zone, introducing at a sufficient rate to heat said briquets to a temperature above 1550° F. into said desulfurizing and calcining zone finely divided fluidizable heat carrying material which is capable of reacting with hydrogen sulfide to form solid sulfides in the presence of hydrogen gas and also capable of rejecting sulfide sulfur under oxidative conditions, further introducing fluidizing gases into said desulfurizing and calcining zone containing sufficient hydrogen to maintain therein a partial pressure of hydrogen greater than one atmosphere at a rate of from 2 to 5 standard cubic feet of hydrogen per pound of briquets entering said desulfurizing and calcining zone, removing sulfided heat carrying material from said desulfurizing and calcining zone for oxidative treatment to reject sulfide sulfur and for reheating, separately recovering gases for reuse in the process and separately recovering calcined desulfurized briquets from said desulfurizing and calcining zone, thereafter cooling said briquets to a temperature below about 600° F. and recovering low sulfur calcined formcoke.

11. The method according to claim 10 wherein the heat carrying medium contains an active acceptor ingredient for reacting with hydrogen sulfide selected from the class consisting of calcium oxide and manganese oxide.

12. The method for preparing low sulfur calcined formcoke which comprises preparing briquets including (a) char having a bulk density less than about 30 pounds per cubic foot and being obtained via fluidized low temperature carbonization of high volatile coal, and (b) caking high volatile coal, virtually instantaneously heating the surface of said briquets to a temperature in the range 900 to 1250° F., maintaining said surface at a temperature of 900 to 1250° F. until the briquets attain a temperature above 900° throughout, thereafter introducing said briquets into a desulfurizing and calcining zone, introducing into said desulfurizing and calcining zone a heating gas substantially free of $H_2S$ containing sufficient hydrogen to maintain therein a partial pressure of one to ten atmospheres of hydrogen at a rate of 5 to 30 standard cubic feet of hydrogen for each pound of briquets entering said desulfurizing and calcining zone, said heating gas having sufficient sensible heat to raise the temperature of briquets in said desulfurizing and calcining zone above 1550° F., separately recovering said gas having a volume ratio of $H_2S/H_2$ less than 0.02 from said desulfurizing and calcining zone, treating at least a portion of said gas to remove substantially all $H_2S$ therefrom and recovering at least a portion thereof for reheating and reuse in the process, separately recovering calcined desulfurized briquets from said desulfurizing and calcining zone, thereafter cooling said briquets to a temperature below about 600° F. and recovering low sulfur calcined formcoke.

13. The method for preparing low-sulfur calcined formcoke of metallurgical grade which comprises heating coal-char agglomerates, including caking coal and low-density char obtained by a low-temperature carbonization of caking coal, the char content of the coal-char agglomerates being at least 40 percent by weight thereof, at a carbonization temperature not greater than 1250° F. to carbonize the agglomerates, heating the carbonized agglomerates from a temperature below 1300° F. to a temperature above 1550° F. while feeding them at atmospheric pressure in a descending column in countercurrent relation to an upwardly moving stream of gas comprising autogenous devolatilization gas, whereby desulfurization and calcining of the agglomerates are effected, and recovering the agglomerates as low-sulfur calcined formcoke of metallurgical grade.

14. The method for preparing low-sulfur calcined formcoke of metallurgical grade which comprises preparing coal-char agglomerates including caking coal and low-density char obtained by a low-temperature carbonization of caking coal, the char content of the coal-char agglomerates being at least 40 percent by weight thereof, rapidly heating the surface of said agglomerates to a temperature in the range of 900 to 1250° F., maintaining the surface at a temperature of 900 to 1250° F. until the agglomerates attain a temperature above 900° F. throughout, heating said agglomerates from a temperature below 1300° F. to a temperature above 1550° F. while feeding them at atmospheric pressure in a descending column in countercurrent relation to an internal upwardly moving stream of gas consisting essentially of autogenous devolatilization gas, whereby desulfurization and calcining of the agglomerates are effected, and recovering the agglomerates as low-sulfur calcined formcoke of metallurgical grade.

15. The method for preparing low-sulfur calcined formcoke of metallurgical grade which comprises preparing briquets including (a) char having a bulk density less than about thirty pounds per cubic foot and obtained by a fluidized low-temperature carbonization of high-volatile coal and (b) high-volatile caking coal, the char content of said briquets being at least 40 percent by weight thereof rapidly heating the surface of said briquets to a temperature in the range 900 to 1250° F., maintaining the surface at a temperature of 900 to 1250° F. until the briquets attain a temperature above 900° F. throughout, heating said briquets from a temperature below 1300° F. to a temperature above 1550° F. while feeding them at atmospheric pressure in a descending column in countercurrent relation to an upwardly moving stream of gas comprising autogenous devolatilization gas, whereby desulfurization and calcining of the briquets are effected, and recovering the briquets as low-sulfur calcined formcoke of metallurgical grade.

16. The method for preparing low-sulfur calcined formcoke of metallurgical grade which comprises preparing briquets including (a) a major portion of char having a bulk density less than about thirty pounds per cubic foot and obtained by a fluidized low-temperature carbonization of high-volatile coal, (b) a minor portion of high-volatile caking coal, and (c) a minor portion of pitch as binder, rapidly heating the surface of said briquets to a temperature in the range 900 to 1250° F., maintaining the surface at a temperature of 900 to 1250° F. until the briquets attain a temperature above 900° F. throughout, heating said briquets from a temperature below 1300° F. to a temperature above 1550° F. in a formcoking vessel while feeding them at atmospheric pressure in a descending column in countercurrent relation to an internal upwardly moving stream of gas consisting essentially of autogenous devolatilization gas, whereby desulfurization and calcining of the briquets are effected, cooling the briquets to a temperature below about 600° F., and recovering the briquets as low-sulfur calcined formcoke of metallurgical grade.

17. The method for preparing low-sulfur calcined formcoke of metallurgical grade which comprises preparing briquets including (a) at least 50 percent by weight thereof of char having a bulk density less than about thirty pounds per cubic foot and obtained by a fluidized low-temperature carbonization of high-volatile caking coal at a temperature not greater than 1400° F., (b) at least 20 percent by weight thereof of high-volatile caking coal, and (c) at least 10 percent by weight thereof of pitch as binder, rapidly heating the surface of said briquets to a temperature in the range 900 to 1250° F., maintaining the surface at a temperature of 900 to 1250° F. until the briquets attain a temperature above 900° F. throughout, heating said briquets from a temperature below 1300° F. to a temperature above 1550° F. for at least one hour in a formcoking vessel while feeding them at atmospheric pressure in a descending column in countercurrent relation to an internal upwardly moving stream of gas consisting essentially of autogenous devolatilization gas, whereby desulfurization and calcining of the briquets are effected, cooling the briquets to a temperature below about 600° F., and recovering the briquets as low-sulfur calcined formcoke of metallurgical grade.

18. The method for preparing low-sulfur calcined formcoke which comprises preparing briquets including (a) from 50 to 75 percent by weight of char having a bulk density less than about thirty pounds per cubic foot and obtained by a fluidized low-temperature carbonization of high-volatile caking coal at a temperature not greater than 1400° F., (b) from 15 to 30 percent by weight of high-volatile caking coal, and (c) from 5 to 15 percent by weight of pitch as binder, rapidly heating the surface of said briquets to a temperature in the range 900 to 1250° F., maintaining said surface at a temperature of 900 to 1250° F. for 30 to 60 minutes until the briquets attain a temperature above 900° F. throughout, heating said briquets from a temperature below 1300° F. to a temperature above 1550° F. for one to four hours in a form-coking vessel while feeding said briquets at atmospheric pressure in a descending column in countercurrent relation to an internal upwardly moving stream of gas consisting essentially of autogenous devolatilization gas containing hydrogen and methane as major constituents, whereby desulfurization and calcining of the briquets are effected, cooling the briquets to a temperature below about 600° F., and recovering the briquets as low-sulfur calcined formcoke of metallurgical grade.

19. The method for preparing low-sulfur calcined formcoke of metallurgical grade from high-sulfur caking coal which comprises subjecting a portion of said coal to low-temperature carbonization to prepare a finely divided low-density char, mixing at least a portion of said char with a portion of said coal and preparing agglomerates from the resulting admixture, the char content of said agglomerates being at least 40 percent by weight thereof, heating said agglomerates at a carbonization temperature not greater than 1250° F. to carbonize the agglomerates, heating the carbonized agglomerates from a temperature below 1300° F. to a temperature above 1550° F. while feeding them at atmospheric pressure in a descending column in countercurrent relation to an internal upwardly moving stream of gas consisting essentially of autogenous devolatilization gas, whereby desulfurization and calcining of the agglomerates are effected, and recovering the agglomerates as low-sulfur calcined formcoke of metallurgical grade.

20. The method for preparing low-sulfur calcined formcoke of metallurgical grade from high-sulfur, high-volatile caking coal which comprises subjecting a portion of said coal to low-temperature carbonization under fluidized conditions to prepare a finely divided char having a bulk density less than about 30 pounds per cubic foot, mixing at least a portion of said char with a portion of said coal and preparing briquets from the resulting admixture, the char content of said briquets being at least 40 percent by weight thereof, rapidly heating the surface of said briquets to a temperature in the range 900 to 1250° F., maintaining said surface at a temperature of 900 to 1250° F. until the briquets attain a temperature above 900° F. throughout, heating said briquets from a temperature below 1300° F. to a temperature above 1550° F. while feeding them at atmospheric pressure in a descending column in countercurrent relation to an internal upwardly moving stream of gas consisting essentially of autogenous devolatilization gas, whereby desulfurization and calcining of the briquets are effected, and recovering the briquets as low-sulfur calcined formcoke of metallurgical grade.

21. The method for preparing low-sulfur calcined formcoke of metallurgical grade from high-sulfur, high-volatile caking coal which comprises subjecting a portion of said coal to low-temperature carbonization under fluidized conditions at a temperature not greater than 1400° F. to prepare a finely divided char having a bulk density less than about 30 pounds per cubic foot, mixing at least a portion of said char with a portion of said coal and with pitch as binder, preparing briquets from the resulting admixture containing from 50 to 75 percent by weight of said char, from 15 to 30 percent by weight of said coal, and from 5 to 15 percent by weight of said pitch, rapidly heating the surface of said briquets to a temperature in the range 900 to 1250° F., maintaining said surface at a temperature of 900 to 1250° F. for 30 to 60 minutes until the briquets attain a temperature above 900° F. throughout, heating said briquets from a temperature below 1300° F. to a temperature above 1550° F. for one to four hours while feeding them at atmospheric pressure in a descending column in countercurrent relation to an internal upwardly moving stream of gas consisting essentially of autogenous devolatilization gas containing hydrogen and methane as major constituents, whereby desulfurization and calcining of the briquets are effected, cooling the briquets to a temperature below about 600° F., and recovering the briquets as low-sulfur calcined formcoke of metallurgical grade.

References Cited in the file of this patent

UNITED STATES PATENTS

| | | |
|---|---|---|
| 1,481,627 | Smith | Jan. 22, 1924 |
| 2,353,753 | Otto | July 18, 1944 |
| 2,717,868 | Gorin et al. | Sept. 13, 1955 |
| 2,721,169 | Mason et al. | Oct. 18, 1955 |
| 2,776,935 | Jahnig et al. | Jan. 8, 1957 |
| 2,793,172 | Smith et al. | May 21, 1957 |
| 2,824,047 | Gorin et al. | Feb. 18, 1958 |
| 2,825,679 | Baum | Mar. 4, 1958 |